US012726569B2

(12) United States Patent
Tzur et al.

(10) Patent No.: US 12,726,569 B2
(45) Date of Patent: Sep. 1, 2026

(54) REDUCING TELEPHONE NETWORK TRAFFIC THROUGH UTILIZATION OF PRE-CALL INFORMATION

(71) Applicant: GOOGLE LLC, Mountain View, CA (US)

(72) Inventors: Yoav Tzur, Tel Aviv (IL); Yaniv Leviathan, New York, NY (US); Yossi Matias, Tel Aviv (IL); Eyal Segalis, Tel Aviv (IL)

(73) Assignee: GOOGLE LLC, Mountain View, CA (US)

( * ) Notice: Subject to any disclaimer, the term of this patent is extended or adjusted under 35 U.S.C. 154(b) by 637 days.

(21) Appl. No.: 18/082,403

(22) Filed: Dec. 15, 2022

(65) Prior Publication Data

US 2024/0205331 A1 Jun. 20, 2024

(51) Int. Cl.
*H04M 3/493* (2006.01)
*G10L 15/22* (2006.01)
(Continued)

(52) U.S. Cl.
CPC ............. *H04M 3/493* (2013.01); *G10L 15/22* (2013.01); *G10L 15/30* (2013.01); *G10L 15/1815* (2013.01); *G10L 2015/223* (2013.01)

(58) Field of Classification Search
USPC ......... 704/1–275; 705/7.11–7.24, 7.34–7.35; 706/1–62, 900–903
See application file for complete search history.

(56) References Cited

U.S. PATENT DOCUMENTS 5,815,566 A 9/1998 Ramot et al.
6,061,433 A 5/2000 Polcyn et al.
(Continued)

FOREIGN PATENT DOCUMENTS

CN 103795877 5/2014
CN 105592237 5/2016
(Continued)

OTHER PUBLICATIONS

European Patent Office; International Search Report and Written Opinion issued in Application No. PCT/US2022/053155; 13 pages; dated Aug. 30, 2023.
(Continued)

*Primary Examiner* — Marcellus J Augustin
(74) *Attorney, Agent, or Firm* — Gray Ice Higdon

(57) ABSTRACT

Implementations receive, via a client device, user input to initiate a telephone call with an entity, and, in response to receiving the user input to initiate the telephone call with the entity and prior to initiating the telephone call with the entity: obtain pre-call information that is stored in association with the entity, and cause the pre-call information that is stored in association with the entity to be provided for presentation to the user via the client device. The pre-call information may include any information that would be provided for presentation to a user subsequent to initiation of the telephone call with the entity. Further, implementations determine, based on user consumption of the pre-call information, whether to (1) proceed with initiating the telephone call with the entity, or (2) refrain from initiating the telephone call with the entity, and cause the client device to implement the appropriate action.

19 Claims, 10 Drawing Sheets

(51) Int. Cl.
*G10L 15/30* (2013.01)
*G10L 15/18* (2013.01)

(56) References Cited

U.S. PATENT DOCUMENTS

| | | | |
|---|---|---|---|
| 6,304,653 | B1 | 10/2001 | O'Neil et al. |
| 6,377,567 | B1 | 4/2002 | Leonard |
| 6,418,199 | B1 | 7/2002 | Perrone |
| 6,731,725 | B1 | 5/2004 | Merwin et al. |
| 6,922,465 | B1 | 7/2005 | Howe |
| 7,084,758 | B1 | 8/2006 | Cole |
| 7,337,158 | B2 | 2/2008 | Fratkina et al. |
| 7,539,656 | B2 | 5/2009 | Fratkina et al. |
| 7,792,773 | B2 | 9/2010 | McCord et al. |
| 7,920,678 | B2 | 4/2011 | Cooper et al. |
| 8,345,835 | B1 | 1/2013 | Or-Bach et al. |
| 8,594,308 | B2 | 11/2013 | Soundar |
| 8,938,058 | B2 | 1/2015 | Soundar |
| 8,964,963 | B2 | 2/2015 | Soundar |
| 9,001,819 | B1 | 4/2015 | Or-Bach |
| 9,098,551 | B1 | 8/2015 | Fryz |
| 9,232,369 | B1 | 1/2016 | Fujisaki |
| 9,318,108 | B2 | 4/2016 | Gruber et al. |
| 9,467,566 | B2 | 10/2016 | Soundar |
| 9,473,637 | B1 | 10/2016 | Venkatapathy et al. |
| 9,721,570 | B1 | 8/2017 | Beal et al. |
| 10,447,860 | B1 | 10/2019 | Hartman et al. |
| 10,777,204 | B2 * | 9/2020 | Sung ....................... G10L 15/22 |
| 11,277,521 | B1 * | 3/2022 | Babikyan ............. H04Q 3/0025 |
| 11,303,749 | B1 | 4/2022 | Baror et al. |
| 2002/0051522 | A1 | 5/2002 | Merrow et al. |
| 2002/0055975 | A1 | 5/2002 | Petrovykh |
| 2003/0009530 | A1 | 1/2003 | Philonenko et al. |
| 2003/0063732 | A1 | 4/2003 | Mcknight |
| 2004/0001575 | A1 | 1/2004 | Tang |
| 2004/0083195 | A1 | 4/2004 | McCord et al. |
| 2004/0213384 | A1 | 10/2004 | Alles et al. |
| 2004/0240642 | A1 | 12/2004 | Crandell et al. |
| 2005/0147227 | A1 | 7/2005 | Chervirala et al. |
| 2005/0175168 | A1 | 8/2005 | Summe et al. |
| 2005/0271250 | A1 | 12/2005 | Vallone et al. |
| 2006/0039365 | A1 | 2/2006 | Ravikumar et al. |
| 2006/0056600 | A1 | 3/2006 | Merrow et al. |
| 2006/0215824 | A1 | 9/2006 | Mitby et al. |
| 2007/0036320 | A1 | 2/2007 | Mandalia et al. |
| 2007/0201664 | A1 | 8/2007 | Salafia |
| 2008/0037754 | A1 | 2/2008 | Bishop |
| 2008/0181371 | A1 | 7/2008 | Merrow et al. |
| 2008/0209449 | A1 | 8/2008 | Maehira |
| 2008/0309449 | A1 | 12/2008 | Martin et al. |
| 2009/0022293 | A1 | 1/2009 | Routt |
| 2009/0029674 | A1 | 1/2009 | Brezina et al. |
| 2009/0089096 | A1 | 4/2009 | Schoenberg |
| 2009/0089100 | A1 | 4/2009 | Nenov et al. |
| 2009/0137278 | A1 | 5/2009 | Haru et al. |
| 2009/0154666 | A1 | 6/2009 | Rios et al. |
| 2009/0232295 | A1 | 9/2009 | Ryskamp |
| 2010/0088613 | A1 | 4/2010 | DeLuca et al. |
| 2010/0104087 | A1 | 4/2010 | Byrd et al. |
| 2010/0124325 | A1 | 5/2010 | Weng et al. |
| 2010/0228590 | A1 | 9/2010 | Muller et al. |
| 2010/0272246 | A1 | 10/2010 | Malik et al. |
| 2011/0092187 | A1 | 4/2011 | Miller |
| 2011/0270687 | A1 | 11/2011 | Bazaz |
| 2012/0016678 | A1 | 1/2012 | Gruber et al. |
| 2012/0109759 | A1 | 5/2012 | Oren et al. |
| 2012/0147762 | A1 | 6/2012 | Hancock et al. |
| 2012/0157067 | A1 | 6/2012 | Turner et al. |
| 2012/0173243 | A1 | 7/2012 | Anand et al. |
| 2012/0271676 | A1 | 10/2012 | Aravamudan et al. |
| 2013/0060587 | A1 | 3/2013 | Bayrak et al. |
| 2013/0077772 | A1 | 3/2013 | Lichorowic et al. |
| 2013/0090098 | A1 | 4/2013 | Gidwani |
| 2013/0136248 | A1 | 5/2013 | Kaiser-Nyman et al. |
| 2013/0163741 | A1 | 6/2013 | Balasaygun et al. |
| 2013/0275164 | A1 | 10/2013 | Gruber et al. |
| 2014/0024362 | A1 | 1/2014 | Kang et al. |
| 2014/0029734 | A1 | 1/2014 | Kim et al. |
| 2014/0037084 | A1 | 2/2014 | Dutta |
| 2014/0107476 | A1 | 4/2014 | Tung et al. |
| 2014/0122077 | A1 | 5/2014 | Nishikawa et al. |
| 2014/0122618 | A1 | 5/2014 | Duan |
| 2014/0200928 | A1 | 7/2014 | Watanabe et al. |
| 2014/0207882 | A1 | 7/2014 | Joo et al. |
| 2014/0247933 | A1 | 9/2014 | Soundar |
| 2014/0279050 | A1 | 9/2014 | Makar et al. |
| 2014/0280464 | A1 | 9/2014 | De Ding et al. |
| 2014/0310365 | A1 | 10/2014 | Sample et al. |
| 2015/0139413 | A1 | 5/2015 | Hewitt et al. |
| 2015/0142704 | A1 | 5/2015 | London |
| 2015/0150019 | A1 | 5/2015 | Sheaffer et al. |
| 2015/0237203 | A1 | 8/2015 | Siminoff |
| 2015/0248817 | A1 | 9/2015 | Steir et al. |
| 2015/0281446 | A1 | 10/2015 | Milstein et al. |
| 2015/0339707 | A1 | 11/2015 | Harrison et al. |
| 2015/0347399 | A1 | 12/2015 | Aue et al. |
| 2015/0350331 | A1 | 12/2015 | Kumar |
| 2015/0358790 | A1 | 12/2015 | Nasserbakht |
| 2016/0028891 | A1 | 1/2016 | Pirat et al. |
| 2016/0105546 | A1 | 4/2016 | Keys et al. |
| 2016/0139998 | A1 | 5/2016 | Dunn et al. |
| 2016/0198045 | A1 | 7/2016 | Kulkarni et al. |
| 2016/0219142 | A1 * | 7/2016 | Brown ................ H04W 68/005 |
| 2016/0227033 | A1 | 8/2016 | Song |
| 2016/0227034 | A1 | 8/2016 | Kulkarni et al. |
| 2016/0277569 | A1 | 9/2016 | Shine et al. |
| 2016/0379230 | A1 | 12/2016 | Chen |
| 2017/0037084 | A1 | 2/2017 | Fasan |
| 2017/0039194 | A1 | 2/2017 | Tschetter |
| 2017/0061091 | A1 | 3/2017 | McElhinney et al. |
| 2017/0094052 | A1 | 3/2017 | Zhang et al. |
| 2017/0177298 | A1 | 6/2017 | Hardee et al. |
| 2017/0180499 | A1 | 6/2017 | Gelfenbeyn et al. |
| 2017/0289332 | A1 | 10/2017 | Lavian et al. |
| 2017/0358296 | A1 | 12/2017 | Segalis et al. |
| 2017/0359463 | A1 | 12/2017 | Segalis et al. |
| 2017/0359464 | A1 | 12/2017 | Segalis et al. |
| 2017/0365277 | A1 | 12/2017 | Park |
| 2018/0124241 | A1 | 5/2018 | Vijaywargi et al. |
| 2018/0124255 | A1 | 5/2018 | Kawamura et al. |
| 2018/0133900 | A1 | 5/2018 | Breazeal et al. |
| 2018/0220000 | A1 | 8/2018 | Segalis et al. |
| 2018/0227416 | A1 | 8/2018 | Segalis et al. |
| 2018/0227417 | A1 | 8/2018 | Segalis et al. |
| 2018/0227418 | A1 | 8/2018 | Segalis et al. |
| 2018/0255178 | A1 | 9/2018 | Deng et al. |
| 2018/0316630 | A1 | 11/2018 | Jacobson |
| 2019/0281159 | A1 | 9/2019 | Segalis et al. |
| 2019/0306314 | A1 | 10/2019 | Segalis et al. |
| 2020/0042597 | A1 | 2/2020 | Wu |
| 2020/0244788 | A1 * | 7/2020 | Adams .................. H01M 1/271 |
| 2020/0314246 | A1 | 10/2020 | Hart |
| 2022/0051664 | A1 * | 2/2022 | Baror ................ G06F 16/90332 |
| 2022/0109753 | A1 * | 4/2022 | Baror ................ H04M 3/42068 |
| 2022/0201119 | A1 | 6/2022 | Baror et al. |
| 2025/0097349 | A1 * | 3/2025 | Nitidharmatut ........ G06N 20/00 |

FOREIGN PATENT DOCUMENTS

| | | |
|---|---|---|
| EP | 1679693 | 7/2006 |
| EP | 2717554 A1 | 4/2014 |
| JP | 2004508748 | 3/2004 |
| JP | 2007219385 | 8/2007 |
| JP | 2007524928 | 8/2007 |
| JP | 2008015439 | 1/2008 |
| JP | 2009210703 | 9/2009 |
| JP | 2015070371 | 2/2015 |
| KR | 20130099423 | 9/2013 |
| KR | 20140121105 | 10/2014 |

(56) References Cited

FOREIGN PATENT DOCUMENTS

| | | |
|---|---|---|
| WO | 2007065193 | 6/2007 |
| WO | 2014197635 | 12/2017 |

OTHER PUBLICATIONS

Leviathan, Yaniv et al. Google Duplex: An AI System for Accomplishing Real-World Tasks Over the Phone; Google AI Blog; 7 pages; dated May 8, 2018.

* cited by examiner

REDUCING TELEPHONE NETWORK TRAFFIC THROUGH UTILIZATION OF PRE-CALL INFORMATION

BACKGROUND

Humans (also referred to as "users") can initiate telephone calls with entities in a variety of manners. For example, users can initiate telephone calls manually by dialing a telephone number associated with an entity via a telephone software application, selecting a contact entry associated with an entity via the telephone software application or a contacts software application, directing input to a call selectable element via a web browser application, and/or by other means. Also, for example, users can initiate telephone calls automatically by using automated assistants. Automated assistants can be interacted with by users via a variety of computing devices, such as smart phones, tablet computers, wearable devices, automobile systems, standalone personal assistant devices, and so forth. The automated assistants receive input from the user (e.g., spoken, touch, and/or typed) and respond with responsive output (e.g., visual and/or audible) and/or by performing various actions, such as initiating assistant telephone calls on behalf of the user.

Upon initiating telephone calls with entities, various entities may employ different mechanisms for providing particular information to users and/or automated assistants. For example, some entities employ human representatives to engage in corresponding conversations with the user and/or automated assistants. These human representatives often provide particular information to the users and/or automated assistants and/or solicit particular information from the users and/or automated assistants. As another example, some entities employ interactive voice response (IVR) systems to engage in corresponding conversations with the user and/or automated assistants. These IVR systems can provide pre-recorded messages that can provide particular information to the users and/or automated assistants to obviate the need for human representatives to answer the telephone calls on behalf of the entities. Further, the IVR system can provide menu options that solicit spoken and/or keypad inputs from the users and/or automated assistant to navigate the IVR system to a desired state.

However, in some instances, the particular information that is provided to the users and/or automated assistants may result in the telephone calls being terminated. For example, assume that a given entity employs an IVR system that provides particular information that undermines the reason or purpose for which the users and/or automated assistants initiated the call. This may include, for example, the particular information notifying the users and/or automated assistants to call a different entity and/or a different telephone number associated with the entity for the reason or purpose. As another example, assume that a given entity employs an IVR system that provides particular information that includes the particular information that the users and/or the automated assistants are seeking in initiating the telephone call. In these instances, the telephone calls may be terminated without the users and/or the automated assistants ever even engaging in the corresponding conversations with the IVR systems and/or the human representatives and despite the particular information being relatively static. As a result, telephone network traffic is unnecessarily increased and computational and/or network resources are unnecessarily wasted in initiating the telephone calls.

SUMMARY

Implementations disclosed herein are directed to techniques for reducing telephone network traffic through utilization of pre-call information, thereby conserving computational and/or network resources in initiating telephone calls. Processor(s) of a client device can receive user input to initiate a telephone call with an entity, and, in response to receiving the user input to initiate the telephone call with the entity and prior to initiating the telephone call with the entity: obtain pre-call information that is stored in association with the entity, and cause the pre-call information that is stored in association with the entity to be provided for presentation to the user via the client device. Notably, the pre-call information may include any information that would be provided for presentation to the user subsequent to initiation of the telephone call with the entity, and optionally omit any explicit IVR system menu options. Also, the pre-call information is provided for presentation to the user subsequent to receiving the user input to initiate the telephone call with the entity, but prior to actual initiation of the telephone call with the entity. Further, the processor(s) of the client device can determine, based on user consumption of the pre-call information by the user, whether to (1) proceed with initiating the telephone call with the entity, or (2) refrain from initiating the telephone call with the entity, and cause the client device to, based on the determination, either (1) proceed with initiating the telephone call with the entity, or (2) refrain from initiating the telephone call with the entity.

Some non-limiting examples of the pre-call information include audio data that can audibly rendered for presentation to the user via speaker(s) of the client device, textual data that can be visually rendered for presentation to the user via a display of the client device, one or more entity deep links that can audibly and/or visually rendered for presentation to the user and that can be selected by the user, and/or any other information that would be provided for presentation to the user subsequent to initiation of the telephone call with the entity. The audio data can capture, for example, messages (pre-recorded or otherwise) that would be provided for audible presentation to the user upon initiation of the telephone call by an IVR system employed by the entity, by a human employed by the entity, or by other mechanisms employed by the entity. The textual data can capture, for example, text corresponding to the messages that would be provided for audible presentation to the user upon initiation of the telephone call, and that is optionally generated using automatic speech recognition (ASR) techniques. The one or more entity deep links can be associated with an alternate telephone call to be placed that is also associated with the entity (e.g., a different location of the entity) or an additional entity that is in addition to the entity (e.g., a different entity altogether), or a software application that is associated with the entity.

In various implementations, the user consumption of the pre-call information may vary based on the pre-call information and/or how the pre-call information is provided for presentation to the user. In some implementations, the pre-call information may be provided for presentation to the user along with a prompt that requests the user to (1) proceed with initiating the telephone call with the entity or (2) refrain from initiating the telephone call with the entity. In these implementations, the processor(s) of the client device can determine whether to (1) proceed with initiating the telephone call with the entity, or (2) refrain from initiating the telephone call with the entity based on a user selection that is responsive to the prompt. For example, a first portion of the prompt may be associated with determining to (1) proceed with initiating the telephone call with the entity, whereas a distinct, second portion of the prompt may be associated with determining to (2) refrain from initiating the telephone call with the entity based on a user selection that is responsive to the prompt. In additional or alternative implementations, the pre-call may be provided for presentation to the user and the telephone call may be initiated in response to determining that a temporal delay has lapsed (and assuming that no user input to (2) refrain from initiating the telephone call with the entity was received prior to the temporal delay lapsing). This provides the user an opportunity to consume the pre-call information prior to determining to (1) proceed with initiating the telephone call with the entity.

In various implementations, the user input that is received to initiate the telephone call with the entity is a spoken utterance that is captured in audio data generated by microphone(s) of the client device. In these implementations, the processor(s) can process, using ASR model(s), the audio data to generate ASR output, such as textual data including recognized text that is predicted to correspond to the spoken utterance. Further, the processor(s) can process, using natural language understanding (NLU) model(s), the ASR output to generate NLU output, such as a <telephone call> intent having an <entity phone number> parameter that includes a telephone number that is associated with the entity. Moreover, the processor(s) can process, using fulfillment model(s) and/or rule(s), the NLU output to generate fulfillment output, such as an action data structure that causes the client device to initiate the telephone call. However, according to techniques described herein and prior to causing the client device to initiate the telephone call, the processor(s) can cause the pre-call information to be provided for presentation to the user of the client device.

In some versions of those implementations, the processor(s) of the client device can determine whether the spoken utterance includes a certain reason for initiating the telephone call with the entity based on the ASR output, the NLU output, and/or the fulfillment output. In these implementations, the processor(s) of the client device can limit the pre-call information to pre-call information that is related to the certain reason (e.g., by only providing a portion of the pre-call information that is related to the certain reason for presentation to the user) and/or more prominently provide the pre-call information that is related to the certain reason (e.g., by providing the portion of the pre-call information that is related to the certain reason more prominently than any other pre-call information) for initiating the telephone call with the entity. For example, the spoken utterance provided by the user can be "call Hypothetical Café and see if they are open for lunch today". In this example, the certain reason for initiating the telephone call with the entity—a fictitious restaurant named "Hypothetical Café"—that is determined based on the ASR output, the NLU output, and/or the fulfillment output may include determining whether Hypothetical Café is open for lunch on the current date. Accordingly, in this example, the processor(s) may determine whether the pre-call information includes any information related to operating hours for lunch. If so, the processor(s) can provide the information related to the operating hours for lunch at Hypothetical Café, and can (2) refrain from initiating the telephone call with the entity based on the pre-call information including the information related to the operating hours for lunch at Hypothetical Café. Otherwise, the processor(s) can (1) proceed with initiating the telephone call with the entity.

In various implementations, the user input that is received to initiate the telephone call with the entity is touch input that is received via a display of the client device. The touch input can be received via various software applications and/or selectable elements. For example, the touch input can be received from entry of a telephone number associated with the entity via a telephone software application, received as a selection of a contact entry associated with the entity via a contacts application or the telephone software application, received as touch input directed to a call selectable element via a web browser application or a navigation software application, and/or via other touch inputs received via other software applications. As another example, the touch input can be directed to a deep link associated with a given state of an IVR system employed by the entity, an extension associated with a particular representative employed by the entity, and/or other selectable elements.

In some versions of these implementations, the processor(s) of the client device can determine whether the spoken utterance includes a certain reason for initiating the telephone call with the entity based on the touch input being directed to a particular software application and/or a particular selectable element. In these implementations, the processor(s) of the client device can limit the pre-call information to pre-call information that is related to the certain reason (e.g., by only providing a portion of the pre-call information that is related to the certain reason for presentation to the user) and/or more prominently provide the pre-call information that is related to the certain reason (e.g., by providing the portion of the pre-call information that is related to the certain reason more prominently than any other pre-call information) for initiating the telephone call with the entity. For example, the touch provided by the user can be associated with a <lost baggage> state of an IVR system associated with a fictitious airline "Example Airline". In this example, the certain reason for initiating the telephone call with the entity—"Example Airline"—that is determined based on the touch input may include determining that the user would like to make an inquiry about lost baggage. Accordingly, in this example, the processor(s) may determine whether the pre-call information includes any information related to lost baggage. If so, the processor(s) can provide the information related to the lost baggage, and can (2) refrain from initiating the telephone call with the entity based on the pre-call information including the information related to the lost baggage at Example Airline. Otherwise, the processor(s) can (1) proceed with initiating the telephone call with the entity.

In various implementations, the pre-call information can be extracted prior to receiving the user input to initiate the telephone call with the entity. For example, an automated assistant executing at a remote system (e.g., a high performance server or cluster of high performance servers) can initiate a plurality of automated telephone calls with the entity. Further, the automated assistant can monitor the plurality of automated telephone calls with the entity to extract any information that is provided subsequent to initiation of the automated telephone calls with the entity. Notably, the automated assistant can monitor this information over multiple calls with the entity to distinguish which information is static and which information is dynamic. In some versions of these implementations, the automated assistant may consider the information pre-call information in response to determining that the information was provided a threshold quantity the plurality of automated telephone calls with the entity. For example, if information that is provided subsequent to initiation of a given automated telephone call with the entity includes holiday operating hours for the entity, but information that is provided subsequent to initiation of a subsequent automated telephone call with the entity does not include holiday operating hours for the entity, then the holiday operating hours for the entity may not be considered pre-call information. This process can be repeated for a plurality of entities, and the corresponding pre-call information for each of the plurality of entities can be stored in one or more databases accessible by the client device.

Although the above techniques are described with respect to the processor(s) of the client device, it should be understood that is for the sake of example and is not meant to be limiting. For example, in other implementations, the processor(s) may be remote from the client device such that the processor(s) are implemented by a remote system. In some versions of these implementations, the user input may be received by the client device, but the remote system may obtain the pre-call information and provide it to the client device for presentation to the user. In additional or alternative versions of these implementations, the pre-call information may be provided as a service to various third-parties.

By using techniques described herein, one or more technical advantages can be achieved. As one non-limiting example, techniques described herein eliminate and/or mitigate instances where computational and/or network resources are unnecessarily wasted in initiating the telephone calls through utilization of the pre-call information. For instance, by providing the pre-call information for presentation to the user subsequent to receiving the user input to initiate the telephone call with the entity but prior to actual initiation of the telephone call with the entity, the pre-call information can undermine a purpose for which the user provided the user input to initiate the telephone call with the entity and/or provide an alternate course of action for the user with respect to the purpose. Accordingly, the user need not proceed with initiating the telephone call with the entity, thereby reducing consumption of computational and/or network resources and reducing telephone network traffic. As another non-limiting example, techniques described herein eliminate and/or mitigate user frustration when computational and/or network resources are unnecessarily wasted in initiating the telephone calls through utilization of the pre-call information. For instance, by providing the pre-call information for presentation to the user subsequent to receiving the user input to initiate the telephone call with the entity but prior to actual initiation of the telephone call with the entity, the user can be better informed, which can result in a conversation conducted during the telephone call being concluded in a more quick and efficient manner, thereby reducing consumption of computational and/or network resources and reducing telephone network traffic.

The above description is provided as an overview of only some implementations disclosed herein. Those implementations, and other implementations, are described in additional detail herein.

DETAILED DESCRIPTION

Figure 1:
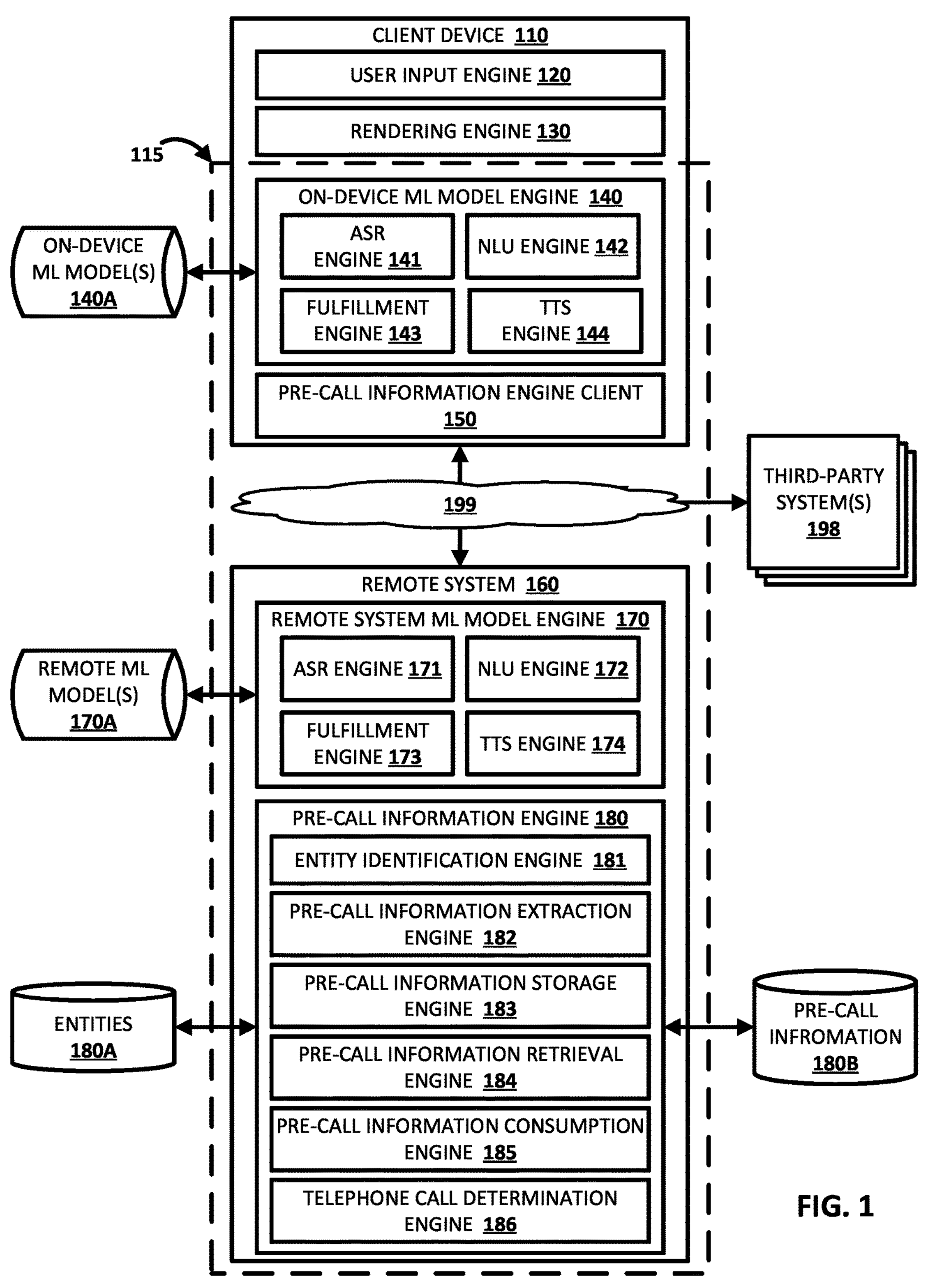
FIG. 1 depicts a block diagram of an example environment that demonstrates various aspects of the present disclosure, and in which implementations disclosed herein can be implemented.

Turning now to FIG. 1, a block diagram of an example environment that demonstrates various aspects of the present disclosure, and in which implementations disclosed herein can be implemented is depicted. A client device 110 is illustrated in FIG. 1, and includes, in various implementations, user input engine 120, rendering engine 130, on-device machine learning (ML) model engine 140, pre-call information engine client 150. The client device 110 can be, for example, a standalone device (e.g., having microphone(s), vision component(s), speaker(s), display(s), and/or other user interface components), a laptop, a desktop computer, a tablet, a wearable computing device, a vehicular computing device, and/or any other client device capable of implementing the chatbot development engine client 150.

The user input engine 120 can detect various types of user input at the client device 110. In some examples, the user input detected at the client device 110 can include spoken input detected via microphone(s) of the client device 110. In these examples, the microphone(s) of the client device 110 can generate audio data that captures spoken utterance(s) included in the spoken input. In other examples, the user input detected at the client device 110 can include touch input detected via user interface input device(s) (e.g., touch sensitive display(s)) of the client device 110, and/or typed input detected via user interface input device(s) (e.g., touch sensitive display(s) and/or keyboard(s)) of the client device 110. In these examples, the user interface input device(s) of the client device 110 can generate textual data that captures the touch input and/or the typed input.

The rendering engine 130 can cause content (e.g., pre-call information and/or other content described herein) to be provided for presentation to the user of the client device. For example, the rendering engine 130 can cause content to be visually rendered for presentation to the user at the client device 110 (e.g., via a touch sensitive display or other user interface output device(s). Further, the rendering engine 130 can cause content to be audibly rendered for presentation to the user at the client device 110 (e.g., via speaker(s) or other user interface output device(s)).

The on-device ML model engine 140 can include, in various implementations, an automatic speech recognition (ASR) engine 141, a natural language understanding (NLU)

engine 142, a fulfillment engine 143, and a text-to-speech (TTS) engine 144. As described in more detail below, these on-device ML model engines of the on-device ML model engine 140 may utilize various on-device ML models (e.g., stored in on-device ML model(s) database 140A) to process various user inputs (e.g., received via the user input engine 120) and to generate various outputs (e.g., to be visually and/or audibly rendered for presentation to the user via the rendering engine 130).

Further, the client device 110 is illustrated in FIG. 1 as communicatively coupled to a remote system 160 over one or more networks 199 (e.g., any combination of Wi-Fi, Bluetooth, or other local area networks (LANs); ethernet, the Internet, or other wide area networks (WANs); and/or other networks). The remote system 160 includes, in various implementations, remote system ML model engine 170 and pre-call information engine 180. The remote system 160 can be, for example, a high-performance server, a cluster of high-performance servers, and/or any other computing device that is remote from the client device 110.

The remote ML model engine 170 can include, in various implementations, an ASR engine 171, an NLU engine 172, a fulfillment engine 173, and a TTS engine 174. As described in more detail below, these remote ML model engines of the remote engine 170 may utilize various remote ML models (e.g., stored in remote ML model(s) database 170A) to process various user inputs (e.g., received from the client device 110 and via the user input engine 120) and to generate various outputs (e.g., to be transmitted to the client device 110 for visual and/or audible presentation to the user and via the rendering engine 130) and in the same or similar manner as the on-device ML model engine 140. In implementations where the remote ML model engine 170 is utilized in processing the various user inputs received at the client device 110 and in generating the various outputs to be provided for presentation to the user at the client device 110, the various user inputs received at the client device 110 may be transmitted from the client device 110 and to the remote system 160 and the various user outputs may be transmitted from the remote system and to the client device 110.

Notably, the pre-call information engine client 150 of the client device 110 can communicate with the pre-call information engine 180 over the one or more networks 199. The pre-call information engine client 150 and the pre-call information engine 180 can be implemented by, from the perspective of a user interacting with the client device 110, a logical instance of an automated assistant 115. Although the automated assistant 115 is depicted in FIG. 1 as being implemented in a distributed manner over the one or more networks 199, it should be understood that is for the sake of example and is not meant to be limiting. For example, the automated assistant 115 can alternatively be implemented exclusively at the client device 110. As another example, the automated assistant 115 can alternatively be implemented exclusively at the remote system 160, but the client device 110 can still enable the user of the client device 110 (and/or other users) to interact with the automated assistant 115.

In various implementations, the user of the client device 110 can provide user inputs (e.g., detected via the user input engine 120) to initiate telephone calls with entities. The telephone calls described herein can be performed using various voice communication protocols including, for example, Voice over Internet Protocol (VoIP), public switched telephone network (PSTN), and/or other telephonic communication protocols. In some versions of those implementations, the user can provide user inputs to initiate the telephone calls described herein on behalf of himself or herself. In other versions of those implementations, the user can provide user inputs directed to the automated assistant 115 to cause the automated assistant 115 to initiate the telephone calls described herein on behalf of the user. In these implementations, these telephone calls may be referred to as assisted telephone calls since the automated assistant 115 is assisting the user in initiating the telephone calls on behalf of the user (and optionally engaging in corresponding conversations during the telephone calls on behalf of the user).

Notably, the automated assistant 115 can be provided by a first-party, but can implement techniques described herein as a service to various third-parties (e.g., implemented by third-party system(s) 198 that are communicatively coupled to the client device 110 and/or the remote system 160 over the one or more networks 199). As used herein, the term first-party refers to an entity that publishes and/or manages the automated assistant 115, whereas the term third-party refers to an entity that is distinct from the entity that publishes and/or manages the automated assistant 115.

In various implementations, the automated assistant 115 can leverage the on-device ML model engine 140 and/or the remote system ML model engine 170 in processing the various user inputs received at the client device 110 and/or in generating the various outputs to be provided for presentation to the user at the client device 110. Each of the sub-engines of the on-device ML model engine 140 and/or the remote system ML model engine 170 may be configured to perform one or more functions. Notably, the remote system ML model engine 170 includes remote based counterparts of the sub-engines of the on-device ML model engine 140. In various implementations, utilization of the on-device ML model engine 140 may be prioritized due at least in part to latency considerations, network bandwidth considerations, privacy considerations, and/or other considerations. In these implementations, the remote system ML model engine 170 may be utilized when one or more of the sub-engines of the on-device ML model engine 140 fail. In other implementations, utilization of the remote ML model engine 170 may be prioritized due at least in part to computational considerations at the client device 110, hardware considerations at the client device 110, software considerations at the client device 110, and/or other considerations. In yet other implementations, the on-device ML model engine 140 and the remote system ML model engine 170 may be utilized in conjunction with one another.

For example, the ASR engine 141 and/or 171 can process, using ASR model(s) stored in the respective ML model(s) databases (e.g., a recurrent neural network (RNN) model, a transformer model, and/or any other type of ML model capable of performing ASR), audio data that captures spoken utterances and that is generated by microphone(s) of the client device 110 to generate ASR output. Further, the NLU engine 142 and/or 172 can process, using NLU model(s) stored in the respective ML model(s) databases (e.g., a long short-term memory (LSTM), gated recurrent unit (GRU), and/or any other type of RNN or other ML model capable of performing NLU) and/or NLU rule(s), the ASR output (or other typed or touch inputs received via the user input engine 120 of the client device 110) to generate NLU output. Moreover, the fulfillment engine 143 and/or 173 can process, using fulfillment model(s) and/or fulfillment rules stored in the respective ML model(s) databases, the NLU data to generate fulfillment output. Additionally, the TTS engine 144 and/or 174 can process, using TTS model(s) stored in the respective ML model(s) databases, textual data (e.g., text formulated by a chatbot) to generate synthesized speech audio data that includes computer-generated synthesized speech corresponding to the textual data.

In various implementations, the ASR output can include, for example, a plurality of speech hypotheses (e.g., term hypotheses and/or transcription hypotheses) for spoken utterances based on the processing of the audio data, and can optionally select a particular speech hypotheses as recognized text for the spoken input based on a corresponding value associated with each of the plurality of speech hypotheses (e.g., probability values, log likelihood values, and/or other values). In various implementations, the ASR model(s) stored in the respective ML model databases are end-to-end speech recognition model(s), such that the ASR engine 141 and/or 171 can generate the plurality of speech hypotheses directly using the model. For instance, the ASR model(s) can be end-to-end model(s) used to generate each of the plurality of speech hypotheses on a character-by-character basis (or other token-by-token basis). One non-limiting example of such end-to-end model(s) used to generate the recognized text on a character-by-character basis is a recurrent neural network transducer (RNN-T) model. An RNN-T model is a form of sequence-to-sequence model that does not employ attention mechanisms.

In other implementations, the ASR model(s) are not end-to-end speech recognition model(s) such that the ASR engine 141 and/or 171 can instead generate predicted phoneme(s) (and/or other representations). For instance, the predicted phoneme(s) (and/or other representations) may then be utilized by the ASR engine 141 and/or 171 to determine a plurality of speech hypotheses that conform to the predicted phoneme(s). In doing so, the ASR engine 141 and/or 171 can optionally employ a decoding graph, a lexicon, and/or other resource(s).

In various implementations, the NLU output can include, for example, annotated recognized text that includes one or more annotations of the recognized text for one or more (e.g., all) of the terms of the recognized text. For example, the NLU engine 142 and/or 172 may include a part of speech tagger (not depicted) configured to annotate terms with their grammatical roles. Additionally, or alternatively, the NLU engine 142 and/or 172 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person, particular place or location of entity that is associated with multiple locations, etc.). The entity tagger may rely on content of user inputs to resolve a particular entity and/or may optionally communicate with a knowledge graph or other entity database to resolve a particular entity.

Additionally, or alternatively, the NLU engine 142 and/or 172 may include a coreference resolver (not depicted) configured to group, or "cluster," references to the same entity based on one or more contextual cues. For example, the coreference resolver may be utilized to resolve the term "them" to "buy theater tickets" in the user input "buy them", based on "theater tickets" being mentioned in a client device notification rendered immediately prior to receiving input "buy them". In some implementations, one or more components of the NLU engine 142 and/or 172 may rely on annotations from one or more other components of the NLU engine 142 and/or 172. For example, in some implementations the entity tagger may rely on annotations from the coreference resolver in annotating all mentions to a particular entity. Also, for example, in some implementations, the coreference resolver may rely on annotations from the entity tagger in clustering references to the same entity. Also, for example, in some implementations, the coreference resolver may rely on user data of the user of the client device 110 in coreference resolution and/or entity resolution.

In various implementations, the fulfillment output can include, for example, one or more tasks to be performed by the automated assistant 115 and on behalf of the user of the client device 110. As described in more detail herein (e.g., with respect to FIGS. 7A and 7B), the user of the client device 110 can provide user inputs to cause the automated assistant 115 to initiate telephone calls with various entities, and the automated assistant 115 can optionally engage in corresponding conversations with human representatives employed by the entities, IVR systems employed by the entities, etc. The corresponding conversations may require the automated assistant 115 to perform task(s) on behalf of the user of the client device 115. Accordingly, it should be understood that the fulfillment output may be dependent on the corresponding conversations and/or the task(s) on behalf of the user of the client device 115 by the automated assistant 115.

In various implementations, the TTS engine 144 and/or 174 can generate synthesized speech audio data that captures computer-generated synthesized speech. The synthesized speech audio data can be rendered at the client device 110 via speaker(s) of the client device 110 and/or rendered at additional client device(s) via respective speaker(s) of the additional client device(s). The synthesized speech may include any output generated by the chatbot described herein, and may include, for example, synthesized speech generated as part of a dialog.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 and/or the remote system 160 (e.g., over the one or more networks 199). As another example, a given client device can be utilized by multiple users in a shared setting (e.g., a group of users, a household, etc.).

The pre-call information engine 180 may include, in various implementations, entity identification engine 181, pre-call information extraction engine 182, pre-call information storage engine 183, pre-call information retrieval engine 184, pre-call information consumption engine 185, and telephone call determination engine 186 as depicted in FIG. 1. Further, the pre-call information engine 180 may have access to various databases, such as entities database 180A and pre-call information database 180B. Although the pre-call information engine 180 is depicted as having particular sub-engines and as having access to particular databases, it should be understood that is for the sake of example and is not meant to be limiting. For example, one or more of the sub-engines and/or one or more of the databases depicted in FIG. 1 may be combined, while one or more other sub-engines engines and/or one or more of the databases depicted in FIG. 1 may be omitted. Further, although the pre-call information engine client 150 is not depicted as including any sub-engines or as having access to any of the databases, it should be understood that is for the sake of brevity and is not meant to be limiting. For example, the pre-call information engine client 150 may include the same sub-engines described with respect to the pre-call information engine 180 or a subset thereof and may have access to the same databases or a subset thereof. Additional description of the pre-call information engine 180 and its various sub-engines and databases is provided with respect to FIGS. 2, 3, and 4.

Figure 2:
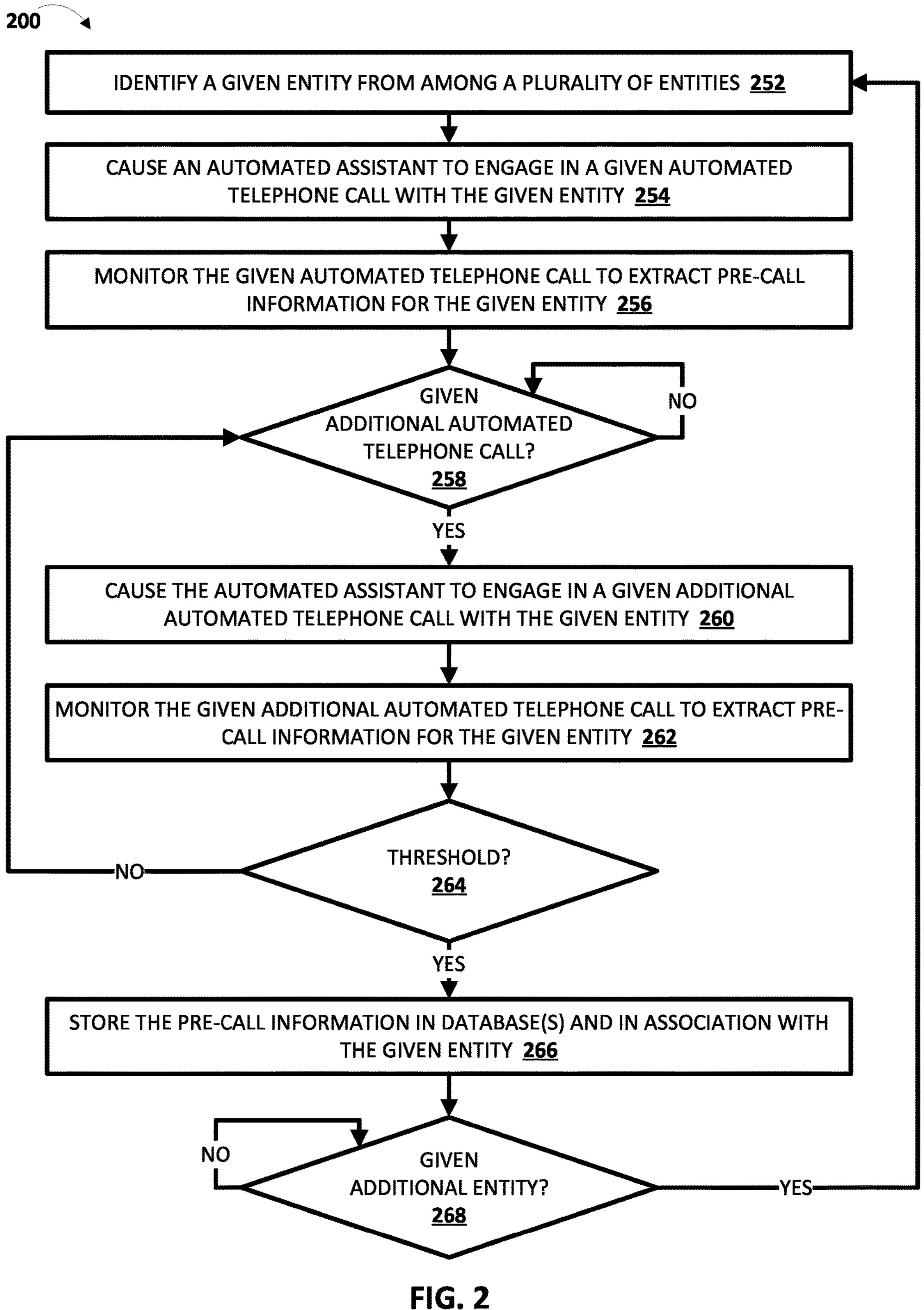
FIG. 2 depicts a flowchart illustrating an example method of extracting and storing pre-call information associated with entities, in accordance with various implementations.

Turning now to FIG. 2, a flowchart illustrating an example method 200 of extracting and storing pre-call information associated with entities is depicted. For convenience, the operations of the method 200 are described with reference to a system that performs the operations. This system of the method 200 includes one or more processors and/or other component(s) of computing device(s) (e.g., client device 110 of FIGS. 1, 6, 7A, and 7B, remote system 160 of FIG. 1, and/or computing device 810 of FIG. 8). Moreover, while operations of the method 200 are shown in a particular order, this is not meant to be limiting. One or more operations may be reordered, omitted, and/or added.

At block 252, the system identifies a given entity from among a plurality of entities. For example, the system can cause the entity identification engine 181 to identify the given entity from the entities database 180A. In some implementations, the system can identify the entity based on user input received by the system from a first-party developer (e.g., a developer that is associated with the automated assistant). In other implementations, the system can randomly identify the entity.

At block 254, the system causes an automated assistant to engage in a given automated telephone call with the given entity. At block 256, the system monitors the given automated telephone call to extract the pre-call information for the given entity. For example, the system can cause the pre-call information extraction engine 182 to initiate the given automated telephone call. These telephone calls may be referred to as automated telephone calls since the automated assistant 115 is initiating the telephone calls, but not to assist any particular user. Further, the system can cause the pre-call information extraction engine 182 to record any information that is provided by human representatives, IVR systems, and/or other mechanisms employed by the given entity and upon initiation of the given automated telephone call. The pre-call information can be stored in association with the given entity (e.g., in the entities database 180A).

At block 258, the system determines whether to cause the automated assistant to engage in a given additional automated telephone call with the given entity. The system can determine whether to cause the automated assistant to engage in the given additional automated telephone call with the given entity based on, for example, a temporal delay lapsing since the given automated telephone call with the given entity was initiated (e.g., a day, a week, a month, a year, etc.) and/or based on other criteria being satisfied. If, at an iteration of block 258, the system determines not to cause the automated assistant to engage in the given additional automated telephone call with the given entity, then the system continues monitoring for the determination of whether to cause the automated assistant to engage in the given additional automated telephone call with the given entity at block 258. If, at an iteration of block 258, the system determines to cause the automated assistant to engage in the given additional automated telephone call with the given entity, then the system proceeds to block 260.

At block 260, the system causes the automated assistant to engage in a given additional automated telephone call with the given entity. At block 262, the system monitors the given additional automated telephone call with the given entity to extract pre-call information for the given entity. For example, the system can cause the pre-call information extraction engine 182 to initiate the given additional automated telephone call. Further, the system can cause the pre-call information extraction engine 182 to again record any information that is provided by human representatives, IVR systems, and/or other mechanisms employed by the given entity and upon initiation of the given automated telephone call. The pre-call information can be stored in association with the given entity (e.g., in the entities database 180A).

At block 264, the system determines whether the pre-call information has been extracted for a threshold quantity of automated telephone calls. In some implementations, the threshold quantity may only be once, whereas in other implementations, the threshold quantity may be multiple (e.g., more than once). If, at an iteration of block 263, the system determines that the pre-call information has not been extracted for the threshold quantity of automated telephone calls, then the system returns to block 258 to continue monitoring for the determination of whether to cause the automated assistant to engage in the given additional automated telephone call with the given entity at block 258 and continues with the method 200. If, at an iteration of block 264, the system determines that the pre-call information has not been extracted for the threshold quantity of automated telephone calls, then the system proceeds to block 266.

At block 266, the system stores the pre-call information in one or more databases and in association with the given entity. For example, the system can cause the pre-call information storage engine 183 to store the pre-call information and in association with the given entity in the pre-call information database 180B. Put another way, the system may initially store the pre-call information in association with the given entity (e.g., in the entities database 180A) as candidate pre-call information, but cause the pre-call information to be stored in association with the given entity as actual pre-call information in response to determining that the pre-call information has been extracted for the threshold quantity of automated telephone calls.

At block 268, the system determines whether to identify a given additional entity. The system can determine to identify the given additional entity subsequent to, for example, the actual pre-call information being extracted for the given entity. If, at an iteration of block 268, the system determines not to identify the given additional entity, then the system continues monitoring for the determination of whether to identify the given additional entity at block 268. If, at an iteration of block 268, the system determines to identify the given additional entity, then the system returns to block 252 to identify the given additional entity at block 252 and continues with the method 200.

Although the method 200 of FIG. 2 is described with respect to extracting and the pre-call information for the given entity and then extracting and storing the pre-call information for the given additional entity in a serial manner, it should be understood that is for the sake of example and is not meant to be limiting. Rather, it should be understood that the system can cause multiple iterations of the method 200 to be performed in a parallel manner and with respect to disparate entities. Further, although the method 200 of FIG. 2 is described with respect to the pre-call information being extracted by the system through automated telephone calls, it should be understood that entities can additionally, or alternatively, provide the pre-call information to the system by other means.

Figure 3:
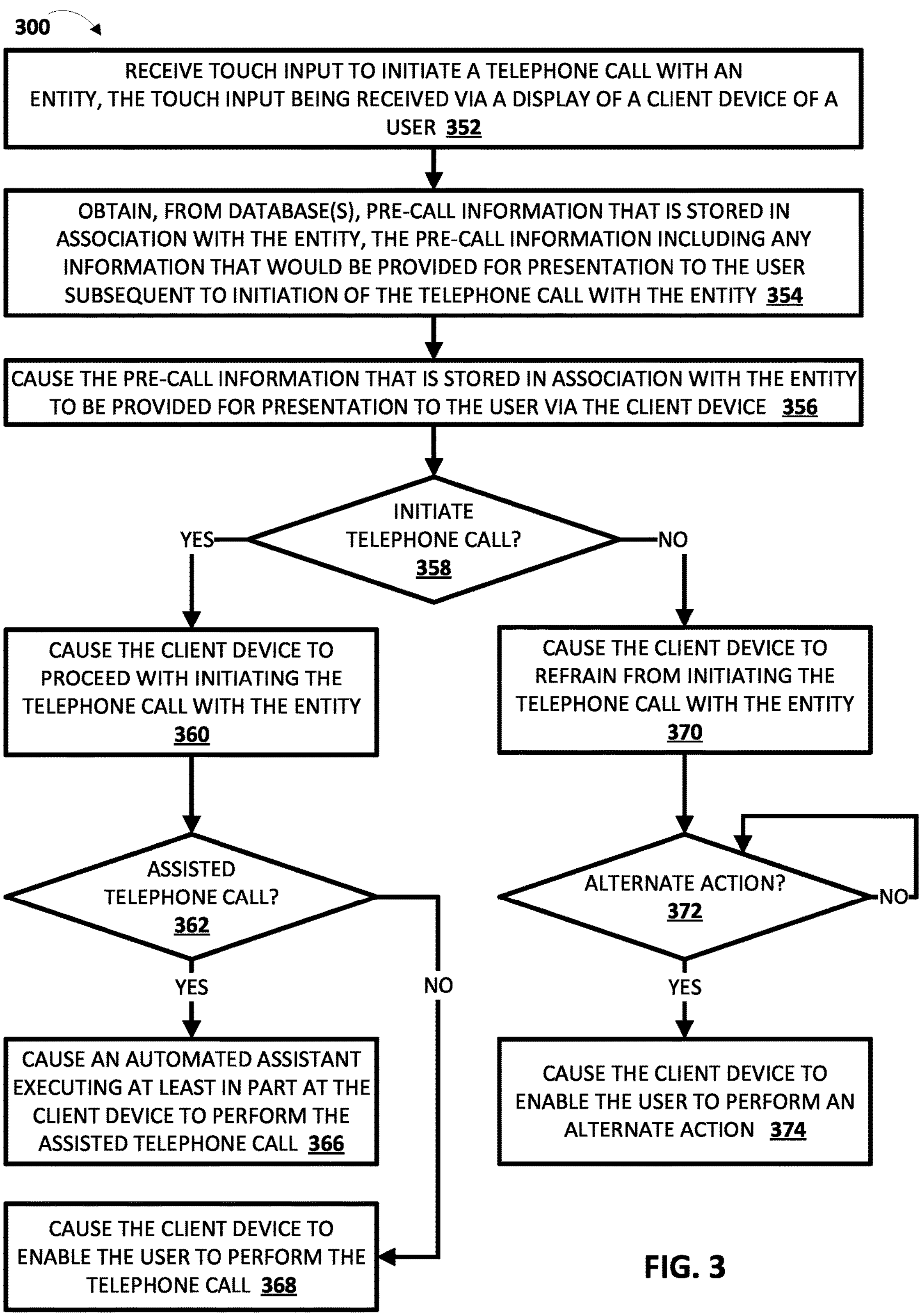
FIG. 3 depicts a flowchart illustrating an example method of receiving touch input from a user to initiate a telephone call with an entity and causing pre-call information associated with the entity to be provided for presentation to the user, in accordance with various implementations.

Turning now to FIG. 3, a flowchart illustrating an example method 300 of receiving touch input from a user to initiate a telephone call with an entity and causing pre-call information associated with the entity to be provided for presentation to the user is depicted. For convenience, the operations of the method 300 are described with reference to a system that performs the operations. This system of the method 300 includes one or more processors and/or other component(s) of computing device(s) (e.g., client device 110 of FIGS. 1, 6, 7A, and 7B, remote system 160 of FIG. 1, and/or computing device 810 of FIG. 8). Moreover, while operations of the method 300 are shown in a particular order, this is not meant to be limiting. One or more operations may be reordered, omitted, and/or added.

At block 352, the system receives, from a user, touch input to initiate a telephone call with an entity, the touch input being received via a display of a client device of the user. For example, the touch input can be received from entry of a telephone number associated with the entity via a telephone software application, received as a selection of a contact entry associated with the entity via a contacts application or the telephone software application, received as touch input directed to a call selectable element via a web browser application or a navigation software application, and/or via other touch inputs received via other software applications. As another example, the touch input can be directed to a deep link associated with a given state of an IVR system employed by the entity, an extension associated with a particular representative employed by the entity, and/or other selectable elements. Put another way, the system can receive the touch input via a touch sensitive display of the client device 110 while the client device is operating one or more of the software applications, and the touch input can be detected via the user input engine 120 of the client device 110.

At block 354, the system obtains, from one or more databases, pre-call information that is stored in association with the entity, the pre-call information including any information that would be provided for presentation to the user subsequent to initiation of the telephone call with the entity. At block 356, the system causes the pre-call information that is stored in association with the entity to be provided for presentation to the user via the client device. For example, the system can cause the pre-call information retrieval engine 184 to obtain the pre-call information that is stored in association with the entity. Further, the system can cause the pre-call information to be visually and/or audibly rendered for presentation to the user (e.g., via the rendering engine 130) and as described in more detail herein (e.g., with respect to FIGS. 6, 7A, and 7B). In some implementations, the system can cause the pre-call information retrieval engine 184 to determine whether there is any pre-call information stored in association with the entity. In these implementations, and in response to determining that there is no pre-call information stored in association with the entity, the method 300 can skip to block 360. Otherwise, the system may proceed with the method 300 of FIG. 3.

At block 358, the system determines whether to initiate the telephone call. The system can determine whether to initiate the telephone call based on, for example, user consumption of the pre-call information that was provided for presentation to the user. For example, the system can cause the pre-call information consumption engine 185 to monitor user consumption of the pre-call information by the user of the client device. Determining whether to initiate the telephone call based on the user consumption of the pre-call information that was provided for presentation to the user is described in more detail herein (e.g., with respect to FIGS. 6, 7A, and 7B).

If, at an iteration of block 358, the system determines to initiate the telephone call, then the system proceeds to block 360. At block 360, the system causes the client device to proceed with initiating the telephone call with the entity. For example, the system can obtain a telephone number associated with the entity and cause a telephone software application of the client device to dial the telephone number associated with the entity. As another example, the system can obtain the telephone number associated with the entity and cause a cloud-based telephone software application to dial the telephone number associated with the entity.

At block 362, the system determines whether the telephone call is an assisted telephone call. The system can determine whether the telephone call is an assisted telephone call based on, for example, the touch input that was provided by the user. For example, if the touch input is received through an automated assistant software application that is associated with the automated assistant or received through other means of interacting with the automated assistant, then the system can determine that the telephone call is an assisted telephone call. Otherwise, the system can assume that the telephone call is not an assisted telephone call.

If, at an iteration of block 362, the system determines that the telephone call is an assisted telephone call, then the system proceeds to block 366. At block 366, the system causes an automated assistant executing at least in part at the client device to perform the assisted telephone call. In these implementations, the automated assistant can host the telephone call locally at the client device or remotely from the client device (e.g., at the remote system 160). These implementations are described in more detail herein (e.g., with respect to FIG. 7B). If, at an iteration of block 362, the system determines that the telephone call is not an assisted telephone call, then the system proceeds to block 368. At block 368, the system causes the client device to enable the user to perform the telephone call. The user can conduct the telephone call in a typical manner for conducting telephone calls.

If, at an iteration of block 358, the system determines not to initiate the telephone call, then the system proceeds to block 370. At block 370, the system causes the client device to refrain from initiating the telephone call with the entity. Put another way, even though the user provided the touch input to initiate the telephone call, the system can determine to actually refrain from actually initiating the telephone call based on the user consumption of the pre-call information. As noted above, determining whether to initiate the telephone call based on the user consumption of the pre-call information that was provided for presentation to the user is described in more detail herein (e.g., with respect to FIGS. 6, 7A, and 7B).

At block 372, the system determines whether to perform an alternate action. The system can determine whether to perform the alternate action based on, for example, further touch input (or other user input) that is received at the client device. If, at an iteration of block 372, the system determines not to perform the alternate action, then the system continues monitoring for the determination of whether to perform the alternate action at block 372. If, at an iteration of block 372, the system determines to perform the alternate action, then the system proceeds to block 374. At block 374, the system causes the client device to enable the user to perform an alternate action. Determining whether to perform the alternate action and causing the client device to enable the user to perform the alternate action is described in more detail herein (e.g., with respect to FIGS. 6, 7A, and 7B).

Although the method 300 of FIG. 3 is described with respect to the telephone call being initiated based on touch input received from the user, it should be understood that is for the sake of example and is not meant to be limiting.

Figure 4:
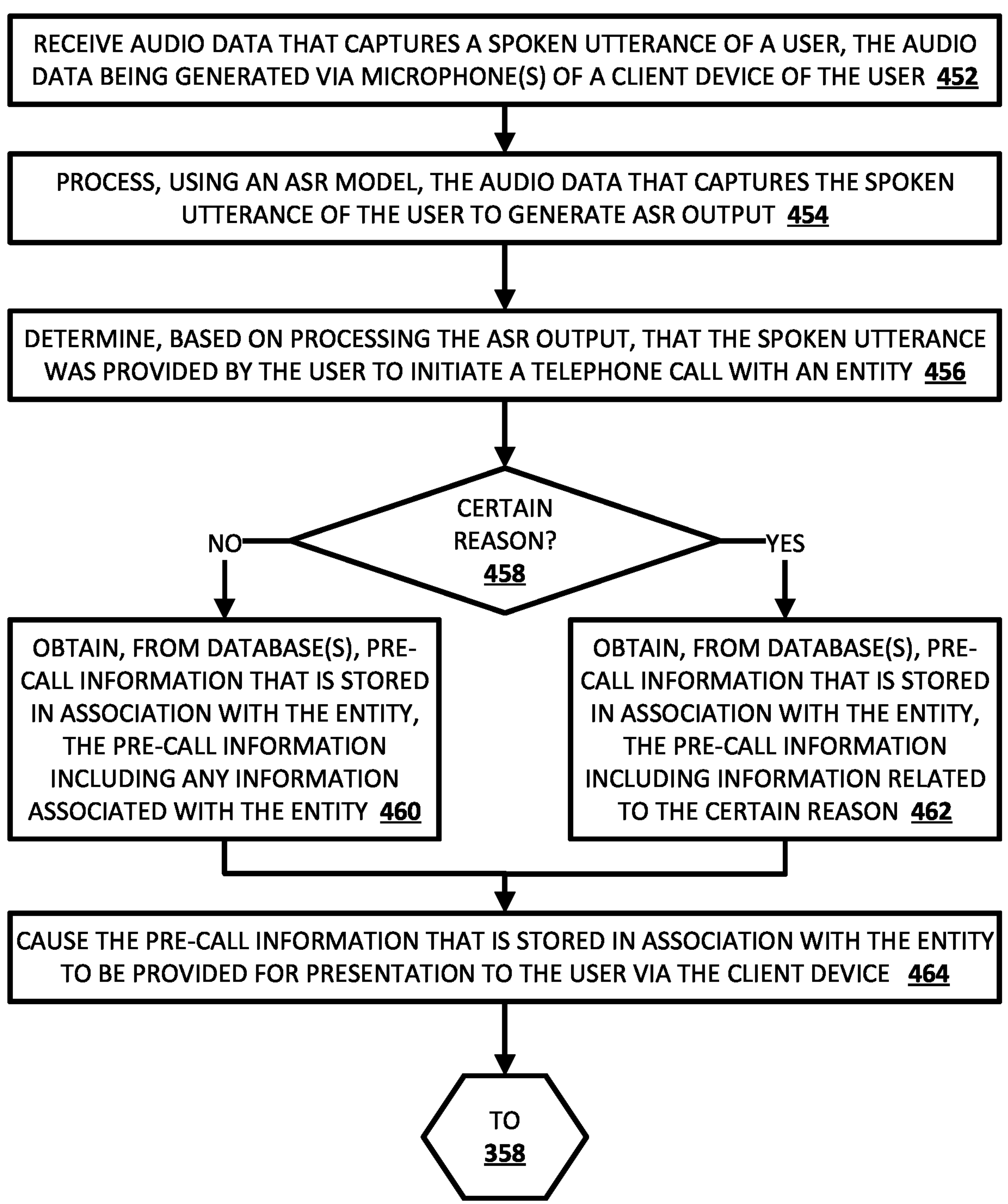
FIG. 4 depicts a flowchart illustrating an example method of receiving a spoken utterance from a user to initiate a telephone call with an entity and causing pre-call information associated with the entity to be provided for presentation to the user, in accordance with various implementations.

Turning now to FIG. 4, a flowchart illustrating an example method 400 of receiving a spoken utterance from a user to initiate a telephone call with an entity and causing pre-call information associated with the entity to be provided for presentation to the user is depicted. For convenience, the operations of the method 400 are described with reference to a system that performs the operations. This system of the method 200 includes one or more processors and/or other component(s) of computing device(s) (e.g., client device 110 of FIGS. 1, 6, 7A, and 7B, remote system 160 of FIG. 1, and/or computing device 810 of FIG. 8). Moreover, while operations of the method 400 are shown in a particular order, this is not meant to be limiting. One or more operations may be reordered, omitted, and/or added.

At block 452, the system receives audio data that captures a spoken utterance of a user, the audio data being generated by one or more microphones of a client device of the user. The spoken utterance can be directed to the automated assistant. In some implementations, the system may only receive the audio data that captures the spoken utterance in response to detecting a particular word or phrase that invokes the automated assistant (e.g., "Assistant", "Hey Assistant", etc.). In additional or alternative implementations, the system may only receive the audio data that captures the spoken utterance in response to detecting actuation of a button to activate speech reception (e.g., a hardware button or a software button). In additional or alternative implementations, the system may only receive the audio data that captures the spoken utterance in response to detecting speech of the user combined with co-occurrence of one or more visual signals, such as a gaze of the user being directed to the client device as the user provide the speech.

At block 454, the system processes, using an ASR model, the audio data that captures the spoken utterance of the user to generate ASR output. The ASR output can include, for example, a plurality of speech hypotheses (e.g., term hypotheses and/or transcription hypotheses) for the spoken utterance and a corresponding value associated with each of the plurality of speech hypotheses. Further, the system can select a given speech hypothesis, from among the plurality of speech hypotheses as textual data that is predicted to capture text corresponding to the spoken utterance.

At block 456, the system determines, based on processing the ASR output, that the spoken utterance was provided by the user to initiate a telephone call with an entity. For example, the system can determine, based on the ASR output and/or NLU output generated based on processing the ASR output includes a <telephone call> intent having an <entity phone number> parameter that includes a telephone number that is associated with the entity, that the spoken utterance was provided by the user to initiate the telephone call with the entity. Accordingly, the system can generate fulfillment output that, when implemented, causes the client device to initiate the telephone call. However, according to techniques described herein, the system can refrain from initiating the telephone call until user consumption of the pre-call information of the pre-call information as described herein.

At block 458, the system determines whether the spoken utterance includes a certain reason for initiating the telephone call. The system can determine whether the spoken utterance includes a certain reason for initiating the telephone call based on the ASR output, the NLU output, and/or the fulfillment output generated based on processing the spoken utterance. Determining whether the spoken utterance includes a certain reason for initiating the telephone call is described in more detail herein (e.g., with respect to FIGS. 7A and 7B).

If, at an iteration of block 458, the system determines that the spoken utterance does not include a certain reason for initiating the telephone call, then the system proceeds to block 460. At block 460, the system obtains from one or more databases, pre-call information that is stored in association with the entity, the pre-call information including any information associated with the entity (e.g., as described with respect to FIG. 7A). The system proceeds to block 464. If, at an iteration of block 458, the system determines that the spoken utterance includes a certain reason for initiating the telephone call, then the system proceeds to block 462. At block 462, the system obtains from one or more databases, pre-call information that is stored in association with the entity, the pre-call information including information related to the certain reason (e.g., as described with respect to FIG. 7B). The system proceeds to block 464. At block 464, the system causes the pre-call information that is stored in association with the entity to be provided for presentation to the user via the client device.

Put another way, the system can dynamically adapt the pre-call information that is obtained and provided for presentation to the user based on whether the spoken utterance includes the certain reason for initiating the telephone call. This dynamic adaptation of the pre-call information enables more efficient user consumption of the pre-call information that is provided for presentation to the user and can reduce the duration of the user interaction with the client device, thereby conserving computational resources at the client device. The system proceeds to the operations of block 358 of the method of FIG. 3 (e.g., as described above with respect to FIG. 3).

Figure 5A:
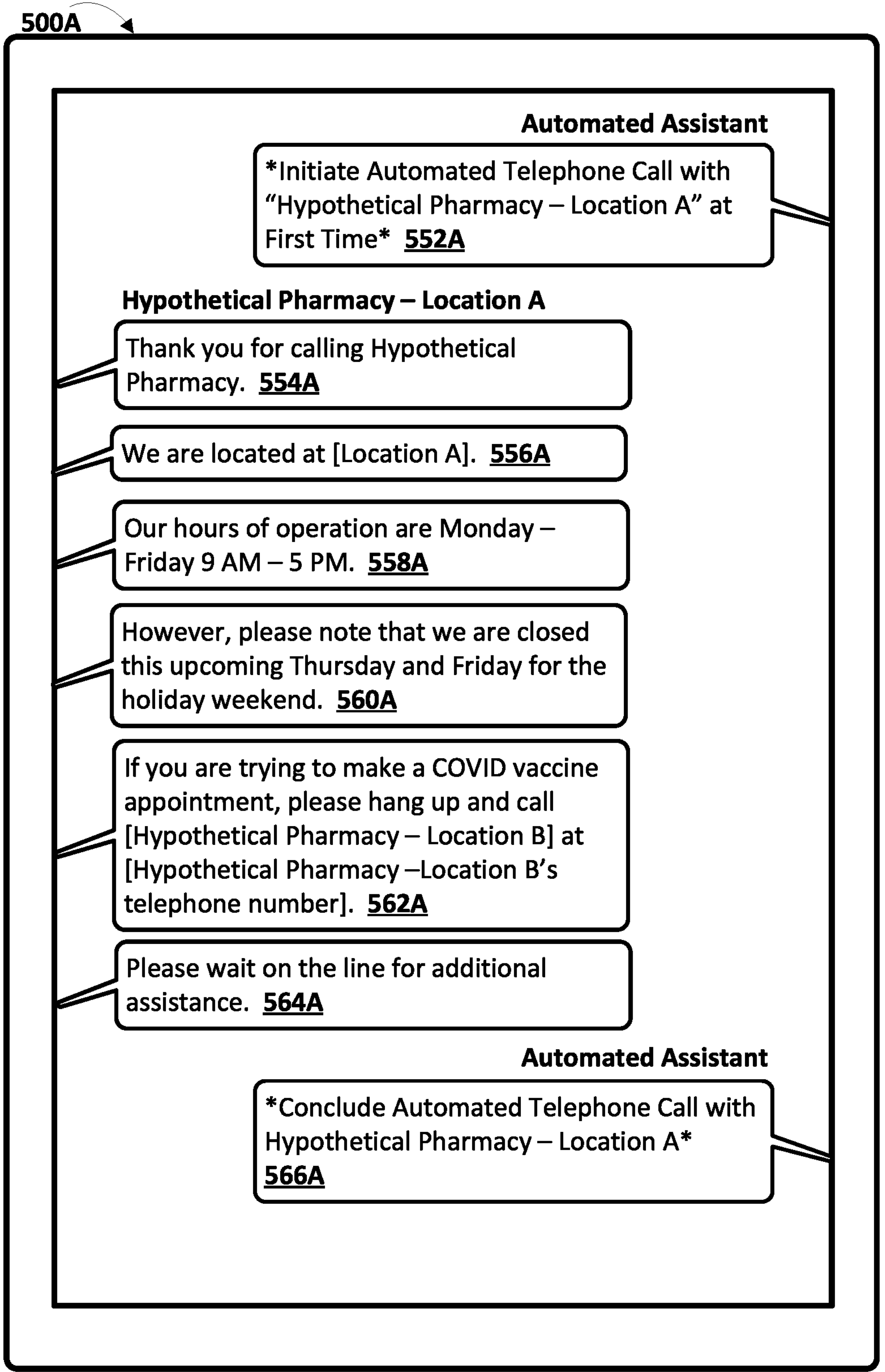
FIG. 5A and FIG. 5B depict a non-limiting example of extracting and storing pre-call information from an entity, in accordance with various implementations.
Figure 5B:
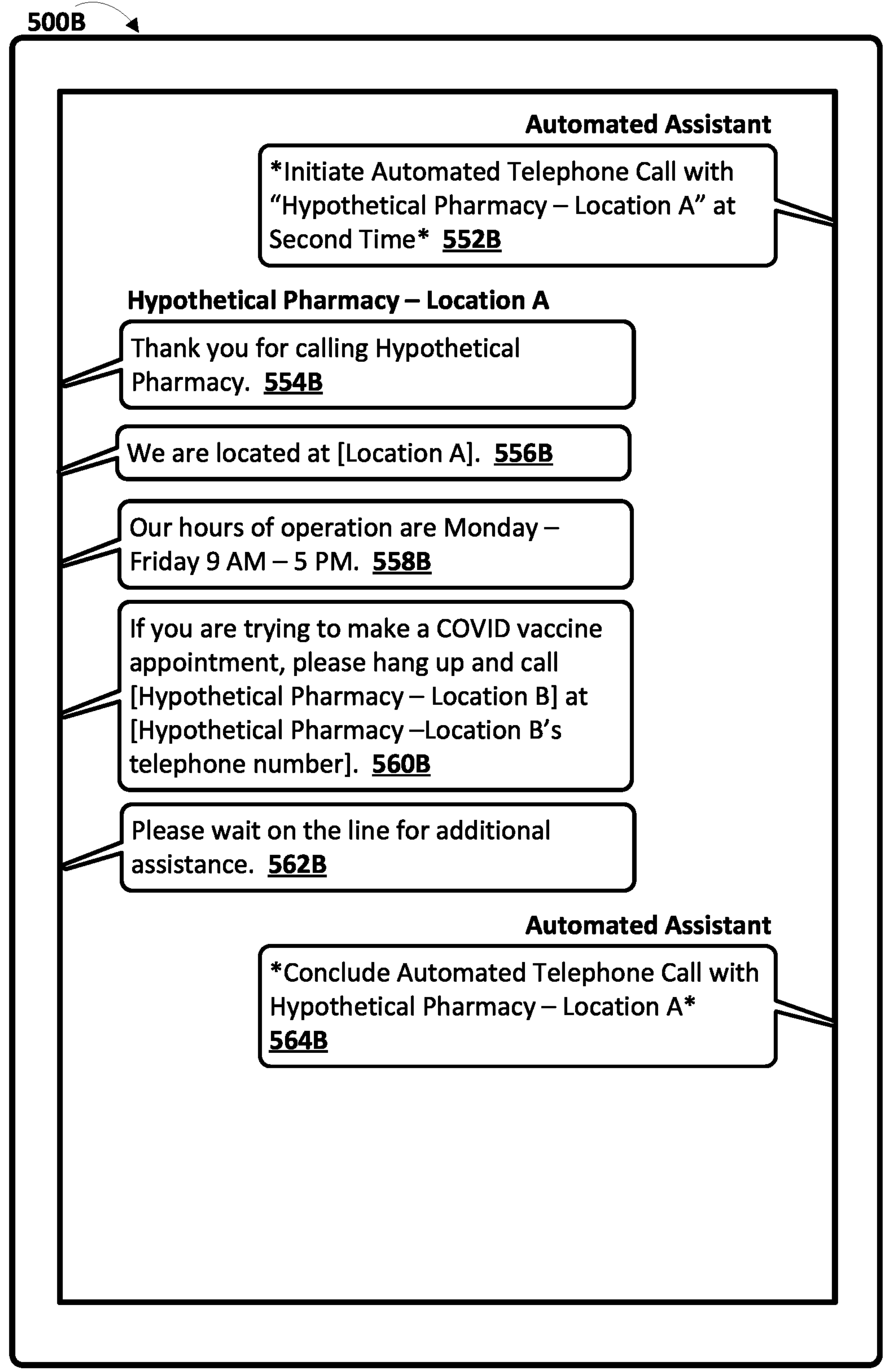

Turning now to FIGS. 5A and 5B, a non-limiting example of extracting and storing pre-call information from an entity is depicted. As described above with respect to FIG. 2, the pre-call information can be extracted based on information gathered from a plurality of automated telephone calls with the entity, and the pre-call information can be stored based on the likelihood that the information would be presented to users in response to initiation of subsequent telephone calls with the entity (e.g., by considering the threshold quantity at block 264 of the method 200 of FIG. 2). The automated telephone calls can be conducted, for example, by an automated assistant executing at least in part, or exclusively, at a remote system (e.g., the remote system 160 of FIG. 1). Although FIGS. 5A and 5B depict transcriptions 500A and 500B of the automated telephone calls, respectively, it should be understood that is for the sake of illustration and is not meant to be limiting.

Referring specifically to FIG. 5A, assume that the automated assistant identifies an entity of "Hypothetical Pharmacy—Location A" from among a plurality of entities. As described herein (e.g., with respect to the NLU engine 142 and/or 172), entities (or entity references to the entities) may be defined by varying degrees of granularity. Accordingly, "Hypothetical Pharmacy" in general may be an entity, a first location of "Hypothetical Pharmacy" ("Hypothetical Pharmacy—Location A") may be a distinct entity, and a second location of "Hypothetical Pharmacy" ("Hypothetical Pharmacy—Location B") may be another distinct entity.

Further assume that, as indicated by 552A, the automated assistant initiates an automated telephone call with "Hypothetical Pharmacy—Location A" at a first time. Subsequent to initiating the automated telephone call with "Hypothetical Pharmacy—Location A" at the first time, further assume that an IVR system employed by "Hypothetical Pharmacy—Location A", a human representative employed by "Hypothetical Pharmacy—Location A", and/or another mechanism employed by "Hypothetical Pharmacy—Location A" provides information to the automated assistant (e.g., via synthesized speech or human speech). As shown in FIG. 5A, the information can include, for example, speech 554A of "Thank you for calling Hypothetical Pharmacy" as a greeting, speech; 556A of "We are located at [Location A]" to indicate a physical location of "Hypothetical Pharmacy—Location A"; speech 558A of "Our hours of operation are Monday—Friday 9 AM-5 PM" to indicate hours of operation of "Hypothetical Pharmacy—Location A"; speech 560A of "However, please note that we are closed this upcoming Thursday and Friday for the holiday weekend" to indicate an upcoming change in the hours of operation of "Hypothetical Pharmacy—Location A"; speech 562A of "If you are trying to make a COVID vaccine appointment, please hang up and call [Hypothetical Pharmacy—Location B] at [Hypothetical Pharmacy—Location B's telephone number]" to indicate that "Hypothetical Pharmacy—Location A" does not administer COVID vaccines; and speech 564A of "Please wait on the line for additional assistance". Based on processing the speech 564A (e.g., based on ASR output and/or NLU output determined based on processing the speech 564A), the automated assistant can determine that the IVR system, the human representative, and/or the other mechanism has concluded providing the information. Accordingly, as indicated by 566A, further assume that the automated assistant concludes the automated telephone call with "Hypothetical Pharmacy—Location A". The automated assistant can cause the information included in the speech from FIG. 5A to be stored in association with "Hypothetical Pharmacy—Location A" as candidate pre-call information.

Referring specifically to FIG. 5B, assume that the automated assistant again identifies the entity of "Hypothetical Pharmacy—Location A" from among the plurality of entities. Further assume that, as indicated by 552B, the automated assistant initiates an automated telephone call with "Hypothetical Pharmacy—Location A" at a second time (e.g., that is subsequent to the first time from FIG. 5A). Subsequent to initiating the automated telephone call with "Hypothetical Pharmacy—Location A" at the second time, further assume that the IVR system, the human representative, and/or the another mechanism again provides information to the automated assistant (e.g., via synthesized speech or human speech). As shown in FIG. 5B, the information can include, for example, speech 554B of "Thank you for calling Hypothetical Pharmacy" as a greeting, speech; 556B of "We are located at [Location A]" to indicate a physical location of "Hypothetical Pharmacy—Location A"; speech 558B of "Our hours of operation are Monday-Friday 9 AM-5 PM" to indicate hours of operation of "Hypothetical Pharmacy—Location A"; speech 560B of "If you are trying to make a COVID vaccine appointment, please hang up and call [Hypothetical Pharmacy—Location B] at [Hypothetical Pharmacy—Location B's telephone number]" to indicate that "Hypothetical Pharmacy—Location A" does not administer COVID vaccines; and speech 562B of "Please wait on the line for additional assistance". Based on processing the speech 562B (e.g., based on ASR output and/or NLU output determined based on processing the speech 562B), the automated assistant can determine that the IVR system, the human representative, and/or the other mechanism has concluded providing the information. Accordingly, as indicated by 564B, further assume that the automated assistant concludes the automated telephone call with "Hypothetical Pharmacy—Location A". The automated assistant can also cause the information included in the speech from FIG. 5B to be stored in association with "Hypothetical Pharmacy—Location A" as candidate pre-call information.

In some implementations, the automated assistant can determine that all of the information included in the speech from FIGS. 5A and 5B is pre-call information. As such, and in response to determining that a user subsequently initiates a telephone call with "Hypothetical Pharmacy—Location A", the pre-call information can be obtained from one or more of the databases, and can be provided for presentation to the user. However, in other implementations, the automated assistant can determine that only a subset of the information included in the speech from FIGS. 5A and 5B is pre-call information. For example, the speech from FIG. 5A includes additional speech that is not included in FIG. 5B (e.g., the speech 560A that indicates the upcoming change in the hours of operation of "Hypothetical Pharmacy—Location A"). Accordingly, in other implementations, the information included in the speech 560A may not be included in pre-call information since the information included in the speech 560A is not detected for a threshold quantity of the automated telephone calls with "Hypothetical Pharmacy—Location A".

Although FIGS. 5A and 5B depict a particular technique for extracting and storing the pre-call information described herein, it should be understood that is for the sake of example and is not meant to be limiting. For example, other techniques may be utilized to extract and/or store the pre-call information, such as receiving the pre-call information from the entities proactively, crawling web pages associated with the entities, and/or other techniques.

Figure 6:
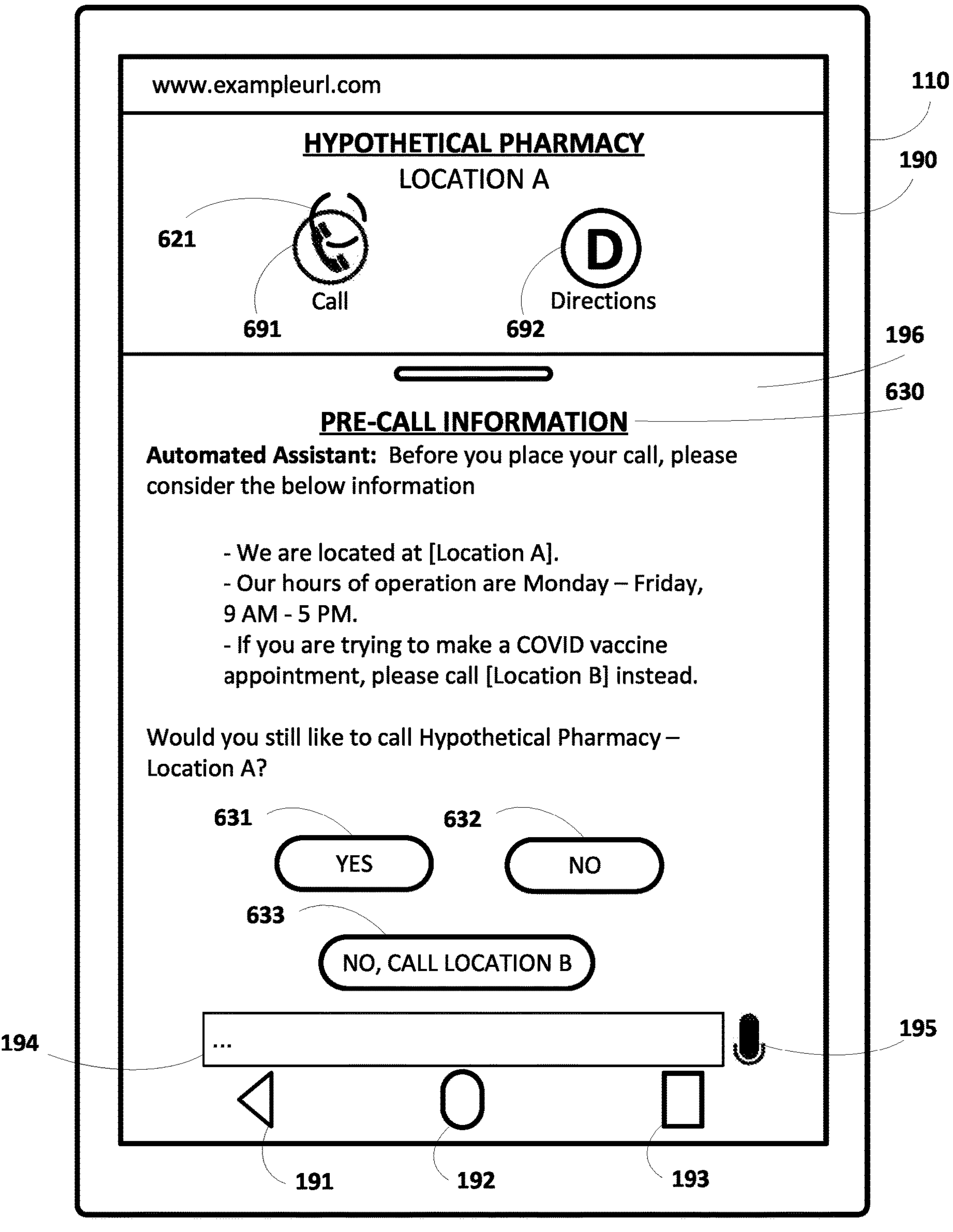
FIG. 6 depicts a non-limiting example of receiving touch input from a user to initiate a telephone call with an entity and causing pre-call information associated with the entity to be provided for presentation to the user, in accordance with various implementations.

Turning now to FIG. 6, a non-limiting example of receiving touch input from a user to initiate a telephone call with an entity and causing pre-call information associated with the entity to be provided for presentation to the user is depicted. FIG. 6 depicts a client device 110 (e.g., the client device 110 from FIG. 1) having a display 190 that is touch sensitive to enable the user to provide touch inputs. One or more aspects of an automated assistant associated with the user of the client device 110 (e.g., the automated assistant 115 from FIG. 1) may be implemented locally on the client device 110 and/or on other computing device(s) that are communicatively coupled to the client device 110. For the sake of simplicity, operations of FIG. 6 are described herein as being performed by the automated assistant. Although the client device 110 of FIG. 6 is depicted as a mobile phone, it should be understood that is not meant to be limiting. The client device 110 can be, for example, a stand-alone speaker, a speaker connected to a graphical user interface, a laptop, a desktop computer, and/or any other client device capable of making telephone calls and implementing an automated assistant.

The display 190 further includes a textual input interface element 194 that the user may select to provide typed input via a virtual keyboard, and a spoken input interface element 195 that the user may select to provide spoken input via microphone(s) of the client device 110. In some implementations, the user may provide spoken input via the microphone(s) without selection of the spoken input interface element 195. For example, active monitoring for spoken input via the microphone(s) may occur to obviate the need for the user to select the spoken input interface element 195. In some of those and/or in other implementations, the spoken input interface element 195 may be omitted. Moreover, in some implementations, the textual input interface element 194 may additionally and/or alternatively be omitted (e.g., the user may only provide spoken input). The display 190 also includes system interface elements 191, 192, 193 that may be interacted with by the user to cause the client device 110 to perform one or more actions.

In the example of FIG. 6, assume that a user of the client device 110 accesses a web page (e.g., "www.exampleurl.com") via a browser software application that is accessible at the client device, and that the user views content associated with "Hypothetical Pharmacy—Location A" (e.g., the entity for which pre-call information was extracted in FIGS. 5A and 5B). The content associated with "Hypothetical Pharmacy—Location A" can include, for example, location information (e.g., as indicated by "Location A" shown on the display 190), a call selectable element 691 that, when selected by the user, is configured to launch a telephone software application and initiate a telephone call with "Hypothetical Pharmacy—Location A", a directions selectable element 692 that, when selected by the user, is configured to launch a navigation software application and provide directions to "Hypothetical Pharmacy—Location A", and/or other content.

For the sake of example, assume that the user selects the call selectable element 691 as indicated by 621. According to techniques described herein, and rather than immediately initiating the telephone call with the entity in response to receiving the user selection, the automated assistant can cause pre-call information 630 stored in association with "Hypothetical Pharmacy—Location A" to be provided for presentation to the user of the client device 110 (and optionally in response to determining that there is pre-call information stored in association with "Hypothetical Pharmacy—Location A"). For example, the pre-call information can be provided for presentation to the user of the client device 110 via a pre-call information interface 196. The pre-call information 630 can include, for example, any information that would be provided for audible presentation to the user upon initiation of the telephone call with "Hypothetical Pharmacy—Location A", such as the information extracted from the automated telephone calls in FIGS. 5A and 5B. For instance, the pre-call information 630 can include a physical location of "Hypothetical Pharmacy—Location A", hours of operation of "Hypothetical Pharmacy—Location A", and an indication that "Hypothetical Pharmacy—Location A" does not administer COVID vaccines but that "Hypothetical Pharmacy—Location B" does administer COVID vaccines. The user of the client device 110 can consume the pre-call information 630, and the automated assistant can determine whether to proceed with initiating the telephone call or to refrain from initiating the telephone call.

In some implementations, the pre-call information can include a prompt that requests a user selection indicating whether the user would like to proceed with initiating the telephone call or to refrain from initiating the telephone call based on consuming the pre-call information. For example, the prompt can include a first selectable element 631 associated with proceeding to initiate the telephone call and a second selectable element 632 associated with refraining from initiating the telephone call. Accordingly, in these implementations, the automated assistant can determine whether to proceed with initiating the telephone call or to refrain from initiating the telephone call based on the user selection received responsive to the prompt.

In some versions of those implementations, or in additional or alternative implementations, the automated assistant can determine to proceed with initiating the telephone call in response to determining that a temporal delay has lapsed with respect to the pre-call information 630 being provided for presentation to the user of the client device 110. For example, if the pre-call information 630 provided for presentation to the user of the client device 110 for 10 seconds or 15 seconds, but does not provide any user selection to the prompt (in implementations where the prompt is provided for presentation to the user) or any other input, then the automated assistant can determine to proceed with initiating the telephone call.

In additional or alternative implementations, the automated assistant can provide an entity deep link 633 that is associated with an alternate action. The entity deep link 633 can be selectable to cause the alternate action to be performed. For example, based on the pre-call information 630 including the indication that "Hypothetical Pharmacy—Location A" does not administer COVID vaccines but that "Hypothetical Pharmacy—Location B" does administer COVID vaccines, the automated assistant can generate the entity deep link 633. The entity deep link 633, when selected, can cause the automated assistant to refrain from initiating the telephone call. Further, the entity deep link 633, when selected, can cause the automated assistant to initiate an alternate telephone call with "Hypothetical Pharmacy—Location B". Although the entity deep link 633 is described with respect to the alternate action being the alternate telephone call, it should be understood that is for the sake of example and is not meant to be limiting. Rather, it should be understood that the entity deep link 633 may vary based on the pre-call information 633 that is extracted for "Hypothetical Pharmacy—Location A". For instance, had the pre-call information indicated that the user should book COVID vaccine appointments online or using a software application associated with "Hypothetical Pharmacy", then the entity deep link 633 could link to a web page associated with "Hypothetical Pharmacy" or a software application associated with "Hypothetical Pharmacy". Also, for instance, had the pre-call information indicated that the user should call to book COVID vaccine appointments during a particular time of day or day of week, the entity deep link 633 could cause a reminder to be generated for the user to call back during the particular time of day or day of week.

Although the pre-call information is described in FIG. 6 as being visually rendered for presentation to the user via the pre-call information interface 196, it should be understood that is for the sake of example and is not meant to be limiting. Additionally, or alternatively, the pre-call information 630 can be provided for audible presentation to the user of the client device 110. Further, although the user selections described with respect to FIG. 6 are described with respect to touch inputs, it should be understood that is for the sake of example and that the user may provide the user selections in any suitable manner (e.g., as spoken inputs). Moreover, although the example of FIG. 6 is described with respect to the telephone call being initiated based on touch input received from the user of the client device 110, it should be understood that is for the sake of example and is not meant to be limiting.

Figure 7A:
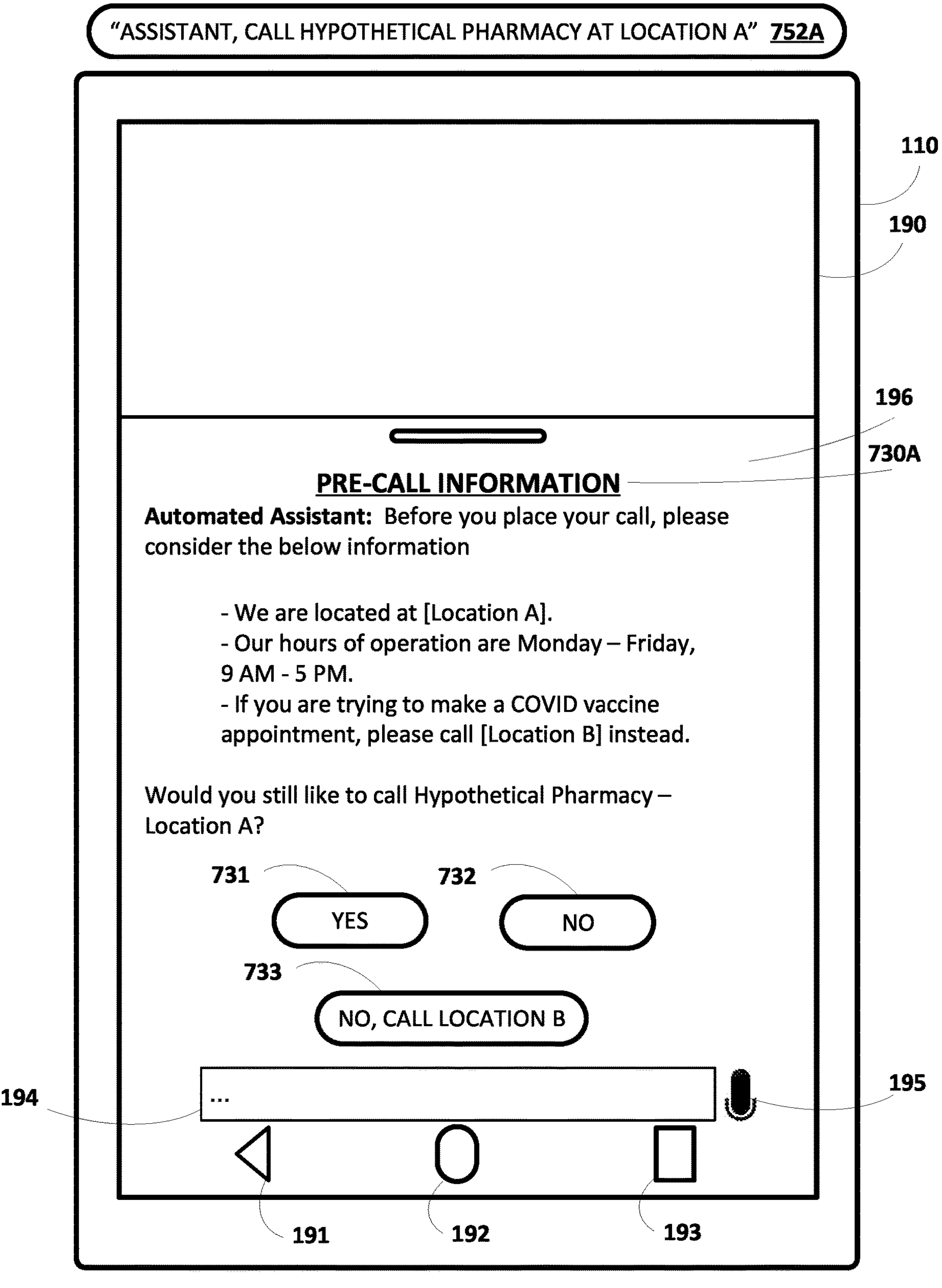
FIG. 7A and FIG. 7B depict non-limiting examples of receiving a spoken utterance from a user to initiate a telephone call with an entity and causing pre-call information associated with the entity to be provided for presentation to the user, in accordance with various implementations.
Figure 7B:
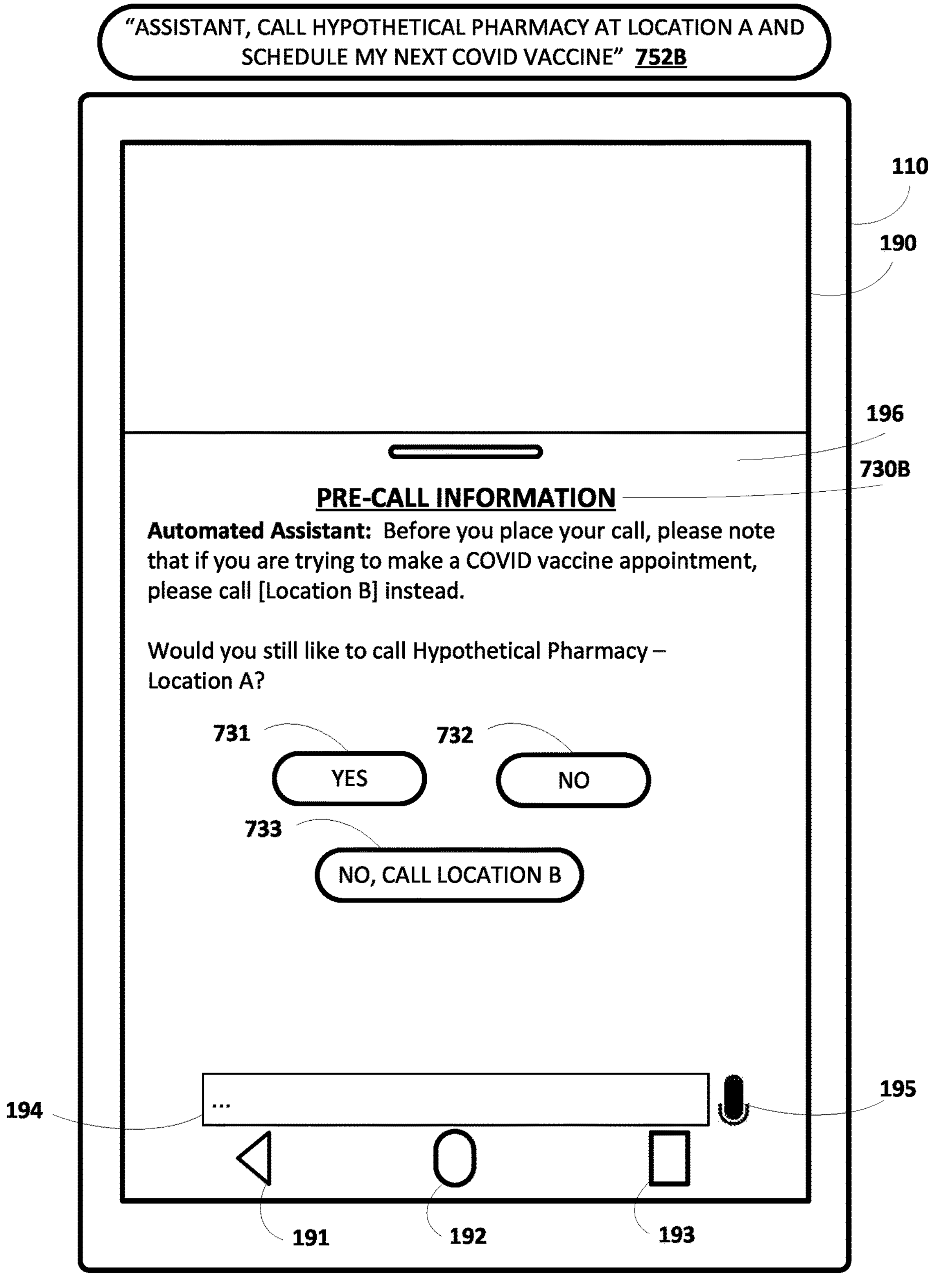

Turning now to FIGS. 7A and 7B, non-limiting examples of receiving a spoken utterance from a user to initiate a telephone call with an entity and causing pre-call information associated with the entity to be provided for presentation to the user are depicted. FIGS. 7A and 7B depict the client device 110 described above with respect to FIG. 6. Referring specifically to FIG. 7A, assume that a user of the client device 110 provides a spoken utterance 752A of "Assistant, call Hypothetical Pharmacy at Location A". In this example, the automated assistant can process audio data that captures the spoken utterance 752A (e.g., ASR processing, NLU processing, fulfillment processing, and/or other processing based on the audio data). Further, and based on processing the audio data that captures the spoken utterance 752A, the automated assistant determines that the user provided the spoken utterance 752A to initiate a telephone call with "Hypothetical Pharmacy—Location A".

According to techniques described herein, and rather than immediately initiating the telephone call with the entity in response to receiving the spoken utterance 752A, the automated assistant can cause pre-call information 730A stored in association with "Hypothetical Pharmacy—Location A" to be provided for presentation to the user of the client device 110 (and optionally in response to determining that there is pre-call information stored in association with "Hypothetical Pharmacy—Location A"). Notably, the automated assistant can determine, based on the processing of the audio data that captures the spoken utterance 752A, that the user did not state any certain reason for initiating the telephone call in the spoken utterance 752A. Accordingly, the pre-call information 730A that is provided for presentation to the user can include any pre-call information that is stored in association with "Hypothetical Pharmacy—Location A", such as the same pre-call information described above with respect to FIG. 6. Further, the automated assistant can determine whether to proceed with initiating the telephone call or to refrain from initiating the telephone call in the same or similar manner described above with respect to FIG. 6 (e.g., based on user selection or non-selection of one or more of selectable elements 731, 732, 733).

In contrast, and referring specifically to FIG. 7B, assume that the user of the client device 110 provides a spoken utterance 752B of "Assistant, call Hypothetical Pharmacy at Location A" and schedule my next COVID vaccine". In this example, the automated assistant can process audio data that captures the spoken utterance 752B (e.g., ASR processing, NLU processing, fulfillment processing, and/or other processing based on the audio data). Further, and based on processing the audio data that captures the spoken utterance 752B, the automated assistant determines that the user provided the spoken utterance 752B to initiate a telephone call with "Hypothetical Pharmacy—Location A". Moreover, and based on processing the audio data that captures the spoken utterance 752B, the automated assistant determines that the user provided the spoken utterance 752B with a certain reason for initiating the call (e.g., scheduling a next COVID vaccine appointment).

According to techniques described herein, and rather than immediately initiating the telephone call with the entity in response to receiving the spoken utterance 752B, the automated assistant can cause pre-call information 730B stored in association with "Hypothetical Pharmacy—Location A" to be provided for presentation to the user of the client device 110 (and optionally in response to determining that there is pre-call information stored in association with "Hypothetical Pharmacy—Location A"). Notably, the automated assistant can determine, based on the processing of the audio data that captures the spoken utterance 752B, that the user did state a certain reason for initiating the telephone call in the spoken utterance 752B. Further, the automated assistant can determine that the certain reason for initiating the telephone call (e.g., scheduling a next COVID vaccine appointment) relates to a portion of the pre-call information that is stored in association with "Hypothetical Pharmacy—Location A". Accordingly, the pre-call information 730B that is provided for presentation to the user can be limited to the pre-call information that is stored in association with "Hypothetical Pharmacy—Location A", such as the portion of the pre-call information related to calling the different location of "Hypothetical Pharmacy" (e.g., with "Hypothetical Pharmacy—Location B"). Further, the automated assistant can determine whether to proceed with initiating the telephone call or to refrain from initiating the telephone call in the same or similar manner described above with respect to FIG. 6 (e.g., based on user selection or non-selection of one or more of selectable elements 731, 732, 733). However, in this example, selection of entity deep link 733 should be received to enable a one-click interaction that results in performance of the alternate action to satisfy the spoken utterance 752B.

Although the pre-call information is described in FIGS. 7A and 7B as being visually rendered for presentation to the user via the pre-call information interface 196, it should be understood that is for the sake of example and is not meant to be limiting. Additionally, or alternatively, the pre-call information 730A and/or 730B can be provided for audible presentation to the user of the client device 110.

Figure 8:
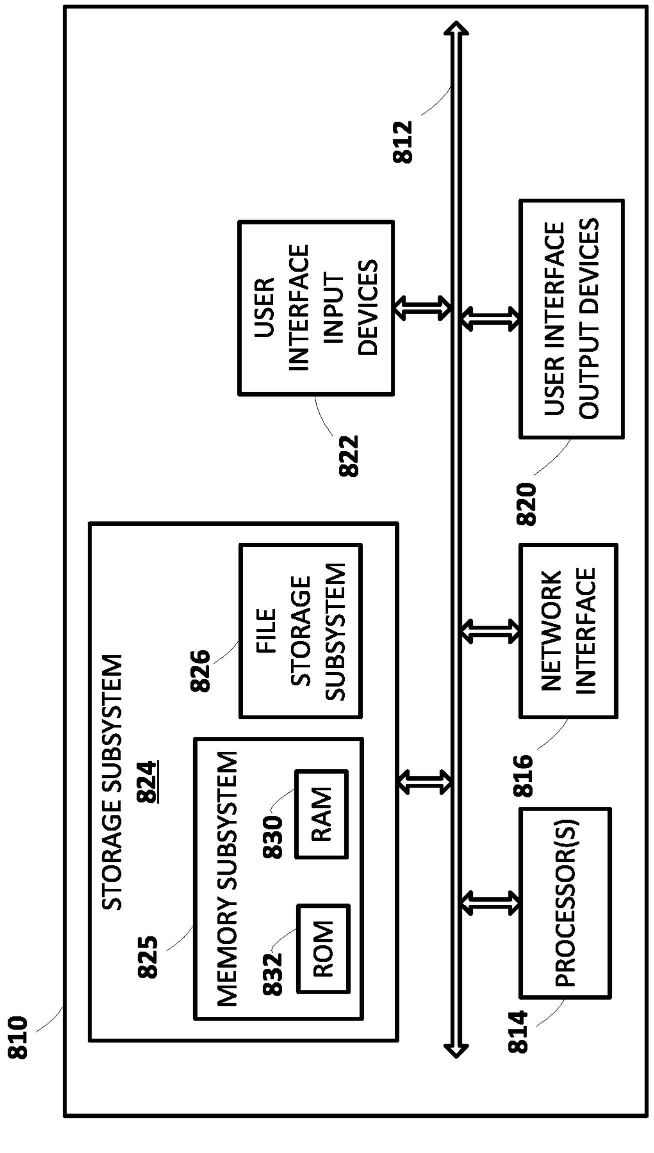
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, cloud-based automated assistant component(s), and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving audio data that captures a spoken utterance of a user, the audio data being generated via one or more microphones of a client device of the user; processing, using an automatic speech recognition (ASR) model, the audio data that captures the spoken utterance of the user to generate ASR output; determining, based on processing the ASR output, that the spoken utterance was provided by the user to initiate a telephone call with an entity; in response to determining that the spoken utterance was provided by the user to initiate the telephone call with the entity and prior to initiating the telephone call with the entity: obtaining, from one or more databases, pre-call information that is stored in association with the entity, the pre-call information including any information that would be provided for presentation to the user subsequent to initiation of the telephone call with the entity; and causing the pre-call information that is stored in association with the entity to be provided for presentation to the user via the client device; determining, based on user consumption of the pre-call information by the user, whether to (1) proceed with initiating the telephone call with the entity, or (2) refrain from initiating the telephone call with the entity; and causing, based on the determination, the client device to (1) proceed with initiating the telephone call with the entity, or (2) refrain from initiating the telephone call with the entity.

These and other implementations of technology disclosed herein can optionally include one or more of the following features.

In some implementations, the method may further include determining, based on the ASR output, whether the spoken utterance was provided by the user includes a certain reason for initiating the telephone call with the entity; in response to determining that the spoken utterance provided by the user includes the certain reason for initiating the telephone call with the entity, determining whether a portion of the pre-call information that is stored in association with the entity is related to certain reason. In these implementations, obtaining the pre-call information that is stored in association with the entity and causing the pre-call information that is stored in association with the entity to be provided for presentation to the user via the client device may be further in response to determining that the certain reason for initiating the telephone call with the entity is related to the portion of the pre-call information that is stored in association with the entity.

In some versions of those implementations, the spoken utterance may be directed to an automated assistant executing at least in part at the client device, the telephone call may be an assisted telephone call to be initiated and performed by the automated assistant and on behalf of the user, and the certain reason may include a task to be performed by the automated assistant and on behalf of the user during the assisted telephone call.

In additional or alternative versions of those implementations, causing the pre-call information that is stored in association with the entity to be provided for presentation to the user via the client device may include causing at least the portion of the pre-call information that is stored in association with the entity and that is related to certain reason to be provided for presentation to the user via the client device. In some further versions of those implementations, causing at least the portion of the pre-call information that is stored in association with the entity and that is related to certain reason to be provided for presentation to the user via the client device may include causing the portion of the pre-call information that is stored in association with the entity and that is related to certain reason to be provided for presentation to the user more prominently than any other portion of the pre-call information.

In additional or alternative versions of those implementations, causing the pre-call information that is stored in association with the entity to be provided for presentation to the user via the client device may include causing only the portion of the pre-call information that is stored in association with the entity and that is related to certain reason to be provided for presentation to the user via the client device.

In some implementations, the method may further include, subsequent to causing the pre-call information that is stored in association with the entity to be provided for presentation to the user via the client device: causing a prompt that requests the user to whether to (1) proceed with initiating the telephone call with the entity or (2) refrain from initiating the telephone call with the entity; receiving, from the user, and based on the user consumption of the pre-call information by the user, a user selection that is responsive to the prompt; and determining, based on the user selection that is responsive to the prompt, whether to (1) proceed with initiating the telephone call with the entity or (2) refrain from initiating the telephone call with the entity.

In some versions of those implementations, the method may further include determining, based on the user selection that is responsive to a first portion of the prompt, to (1) proceed with initiating the telephone call with the entity.

In additional or alternative versions of those implementations, the method may further include determining, based on the user selection that is responsive to a second portion of the prompt that is distinct from the first portion of the prompt, to (1) refrain from initiating the telephone call with the entity.

In some implementations, the method may further include, subsequent to causing the pre-call information that is stored in association with the entity to be provided for presentation to the user via the client device: determining whether a temporal delay has lapsed subsequent to initially causing the pre-call information that is stored in association with the entity to be provided for presentation to the user via the client device; and in response to determining that no user input was received to (2) refrain from initiating the telephone call with the entity and prior to the temporal delay lapsing, determining, based on the user consumption of the pre-call information by the user, to (1) proceed with initiating the telephone call with the entity.

In some versions of those implementations, the method may further include, in response to determining that user input was received to (2) refrain from initiating the telephone call with the entity and prior to the temporal delay lapsing, determining, based on the user consumption of the pre-call information by the user, to (2) refrain from initiating the telephone call with the entity.

In some implementations, the pre-call information that is stored in association with the entity may include an entity deep link that is to be provided for visual presentation to the user via a display of the client device, and the entity deep link may be associated with one or more of: an alternate telephone call that is also associated with the entity or an additional entity that is in addition to the entity, or a software application that is associated with the entity.

In some versions of those implementations, the method may further include: receiving, from the user, and based on the user consumption of the pre-call information by the user, a user selection of the entity deep link; causing the client device to navigate to the webpage or software application associated with the entity; and determining, based on the user consumption of the pre-call information by the user, to (2) refrain from initiating the telephone call with the entity.

In some implementations, the pre-call information that is stored in association with the entity may include entity textual data that is to be provided for visual presentation to the user via a display of the client device.

In some implementations, the pre-call information that is stored in association with the entity may include entity audio data that is to be provided for audible presentation to the user via one or more speakers of the client device.

In some implementations, the method may further include, prior to receiving the audio data that captures the spoken utterance of the user: extracting the pre-call information; and storing the pre-call information in association with the entity.

In some versions of those implementations, extracting the pre-call information may include: causing an automated assistant to engage in a plurality of automated telephone calls with the entity; and monitoring the plurality of automated telephone calls with the entity to extract the pre-call information.

In some further versions of those implementations, storing the pre-call information in association with the entity may include: determining that the pre-call information was provided by the entity during a threshold quantity of the plurality of automated telephone calls with the entity.

In some implementations, a method implemented by one or more processors is provided, and includes: receiving touch input to initiate a telephone call with an entity, the touch input being received via a display of a client device of a user; in response to receiving the touch input to initiate the telephone call with the entity and prior to initiating the telephone call with the entity: obtaining, from one or more databases, pre-call information that is stored in association with the entity, the pre-call information including any information that would be provided for presentation to the user subsequent to initiation of the telephone call with the entity; and causing the pre-call information that is stored in association with the entity to be provided for presentation to the user via the client device; determining, based on user consumption of the pre-call information by the user, whether to (1) proceed with initiating the telephone call with the entity, or (2) refrain from initiating the telephone call with the entity; and causing, based on the determination, the client device to (1) proceed with initiating the telephone call with the entity or (2) refrain from initiating the telephone call with the entity.

In some implementations, a method implemented by one or more processors is provided, and includes: receiving user input to initiate a telephone call with an entity, the user input being received via a client device of a user; in response to receiving the user input to initiate the telephone call with the entity and prior to initiating the telephone call with the entity: obtaining, from one or more databases, pre-call information that is stored in association with the entity, the pre-call information including any information that would be provided for presentation to the user subsequent to initiation of the telephone call with the entity; and causing the pre-call information that is stored in association with the entity to be provided for presentation to the user via the client device; determining, based on user consumption of the pre-call information by the user, whether to (1) proceed with initiating the telephone call with the entity, or (2) refrain from initiating the telephone call with the entity; and causing, based on the determination, the client device to (1) proceed with initiating the telephone call with the entity or (2) refrain from initiating the telephone call with the entity.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:

receiving user input to initiate an assisted telephone call with an entity,
  the user input being received via a client device of a user,
  the user input identifying the entity,
  the user input identifying a task to be performed by an automated assistant and on behalf of the user during the assisted telephone call, and
  the assisted telephone call to be initiated and conducted by the automated assistant;

in response to determining that the user input was provided by the user to initiate the assisted telephone call with the entity and prior to the automated assistant initiating the assisted telephone call with the entity:
  obtaining, from one or more databases, pre-call information that is stored in association with the entity and that is related to the task to be performed by the automated assistant and on behalf of the user during the assisted telephone call, the pre-call information being previously stored in the one or more databases based on one or more previous telephone calls with the entity related to the task;
  causing the pre-call information that is stored in association with the entity and that is related to the task to be performed by the automated assistant and on behalf of the user during the assisted telephone call to be provided for presentation to the user via the client device; and
  causing a prompt that requests the user as to whether to cause the automated assistant to (1) proceed with initiating and conducting the assisted telephone call with the entity to perform the task on behalf of the user or (2) refrain from initiating the assisted telephone call with the entity;

receiving, from the user, and based on user consumption of the pre-call information, a user selection directed to a portion of the prompt;

determining, based on the user selection, whether to cause the automated assistant to (1) proceed with initiating and conducting the assisted telephone call with the entity to perform the task on behalf of the user, or to cause the automated assistant to (2) refrain from initiating the assisted telephone call with the entity;

in response to determining to cause the automated assistant to (1) proceed with initiating and conducting the assisted telephone call with the entity to perform the task on behalf of the user:
  causing the automated assistant to initiate and conduct the assisted telephone call with the entity to perform the task on behalf of the user; and in response to determining to cause the automated assistant to (2) refrain from initiating the assisted telephone call with the entity:
  causing the automated assistant to refrain from initiating the assisted telephone call with the entity.

2. The method of claim 1, further comprising:

determining whether a portion of the pre-call information that is stored in association with the entity is related to the task to be performed by the automated assistant and on behalf of the user during the assisted telephone call; and wherein obtaining the pre-call information that is stored in association with the entity is further in response to determining that the task to be performed by the automated assistant and on behalf of the user during the assisted telephone call is related to the portion of the pre-call information that is stored in association with the entity.

3. The method of claim 2, wherein the user input is a spoken utterance directed to the automated assistant.

4. The method of claim 2, wherein causing the pre-call information that is stored in association with the entity and that is related to the task to be performed by the automated assistant and on behalf of the user during the assisted telephone call to be provided for presentation to the user via the client device comprises causing at least the portion of the pre-call information that is stored in association with the entity and that is related to the task to be performed by the automated assistant and on behalf of the user during the assisted telephone call to be provided for presentation to the user via the client device.

5. The method of claim 4, wherein causing at least the portion of the pre-call information that is stored in association with the entity and that is related to the task to be performed by the automated assistant and on behalf of the user during the assisted telephone call to be provided for presentation to the user via the client device comprises causing the portion of the pre-call information that is stored in association with the entity and that is related to the task to be performed by the automated assistant and on behalf of the user during the assisted telephone call to be provided for presentation to the user more prominently than any other portion of the pre-call information.

6. The method of claim 2, wherein causing the pre-call information that is stored in association with the entity and that is related to the task to be performed by the automated assistant and on behalf of the user during the assisted telephone call to be provided for presentation to the user via the client device comprises causing only the portion of the pre-call information that is stored in association with the entity and that is related to the task to be performed by the automated assistant and on behalf of the user during the assisted telephone call to be provided for presentation to the user via the client device.

7. The method of claim 1, further comprising:

determining, based on the user selection that is responsive to a first portion of the prompt, to cause the automated assistant to (1) proceed with initiating and conducting the assisted telephone call with the entity to perform the task on behalf of the user.

8. The method of claim 1, further comprising:
determining, based on the user selection that is responsive to a second portion of the prompt that is distinct from the first portion of the prompt, to cause the automated assistant to (2) refrain from initiating the assisted telephone call with the entity.

9. The method of claim 1, further comprising:
subsequent to causing the pre-call information that is stored in association with the entity and that is related to the task to be performed by the automated assistant and on behalf of the user during the assisted telephone call to be provided for presentation to the user via the client device:
determining whether a temporal delay has lapsed subsequent to initially causing the pre-call information that is stored in association with the entity and that is related to the task to be performed by the automated assistant and on behalf of the user during the assisted telephone call to be provided for presentation to the user via the client device; and
in response to determining that no further user input was received to cause the automated assistant to (2) refrain from initiating the assisted telephone call with the entity and prior to the temporal delay lapsing, determining, based on the user consumption of the pre-call information by the user, to cause the automated assistant to (1) proceed with initiating and conducting the assisted telephone call with the entity to perform the task on behalf of the user.

10. The method of claim 9, further comprising:
in response to determining that user input was received to cause the automated assistant to (2) refrain from initiating the assisted telephone call with the entity and prior to the temporal delay lapsing, determining, based on the user consumption of the pre-call information by the user, to cause the automated assistant to (2) refrain from initiating the assisted telephone call with the entity.

11. The method of claim 1, wherein the pre-call information that is stored in association with the entity includes an entity deep link that is to be provided for visual presentation to the user via a display of the client device, and wherein the entity deep link is associated with one or more of: an alternate telephone call that is also associated with the entity or an additional entity that is in addition to the entity, or a software application that is associated with the entity.

12. The method of claim 11, further comprising:
receiving, from the user, and based on the user consumption of the pre-call information by the user, a user selection of the entity deep link;
causing the client device to navigate to a webpage or software application associated with the entity; and
determining, based on the user consumption of the pre-call information by the user, to (2) refrain from initiating the assisted telephone call with the entity.

13. The method of claim 1, wherein the pre-call information that is stored in association with the entity includes entity textual data that is to be provided for visual presentation to the user via a display of the client device.

14. The method of claim 1, wherein the pre-call information that is stored in association with the entity includes entity audio data that is to be provided for audible presentation to the user via one or more speakers of the client device.

15. The method of claim 1, further comprising:
prior to receiving the user input to initiate the assisted telephone call with the entity:
extracting the pre-call information; and
storing the pre-call information in association with the entity.

16. The method of claim 15, wherein extracting the pre-call information comprises:
causing the automated assistant or an additional automated assistant to engage in a plurality of automated telephone calls with the entity; and
monitoring the plurality of automated telephone calls with the entity to extract the pre-call information.

17. The method of claim 16, wherein storing the pre-call information in association with the entity comprises:
determining that the pre-call information was provided by the entity during a threshold quantity of the plurality of automated telephone calls with the entity.

18. A system comprising:
at least one processor; and
memory storing instructions that, when executed, cause the at least one processor to be operable to:
receive user input to initiate an assisted telephone call with an entity,
the user input being received via a client device of a user,
the user input identifying the entity,
the user input identifying a task to be performed by an automated assistant and on behalf of the user during the assisted telephone call, and
the assisted telephone call to be initiated and conducted by the automated assistant;
in response to determining that the user input was provided by the user to initiate the assisted telephone call with the entity and prior to the automated assistant initiating the assisted telephone call with the entity:
obtain, from one or more databases, pre-call information that is stored in association with the entity and that is related to the task to be performed by the automated assistant and on behalf of the user during the assisted telephone call, the pre-call information being previously stored in the one or more databases based on one or more previous telephone calls with the entity related to the task;
cause the pre-call information that is stored in association with the entity and that is related to the task to be performed by the automated assistant and on behalf of the user during the assisted telephone call to be provided for presentation to the user via the client device; and
cause a prompt that requests the user as to whether to cause the automated assistant to (1) proceed with initiating and conducting the assisted telephone call with the entity to perform the task on behalf of the user or (2) refrain from initiating the assisted telephone call with the entity;
receive, from the user, and based on user consumption of the pre-call information, a user selection directed to a portion of the prompt;
determine, based on the user selection, whether to cause the automated assistant to (1) proceed with initiating and conducting the assisted telephone call with the entity to perform the task on behalf of the user, or to cause the automated assistant to (2) refrain from initiating the assisted telephone call with the entity;
in response to determining to cause the automated assistant to (1) proceed with initiating and conducting the assisted telephone call with the entity to perform the task on behalf of the user:

cause the automated assistant to initiate and conduct the assisted telephone call with the entity to perform the task on behalf of the user; and in response to determining to cause the automated assistant to (2) refrain from initiating the assisted telephone call with the entity:

cause the automated assistant to refrain from initiating the assisted telephone call with the entity.

19. A non-transitory computer-readable storage medium storing instructions that, when executed by at least one processor, cause the at least one processor to perform operations to:

receive user input to initiate an assisted telephone call with an entity, the user input being received via a client device of a user, the user input identifying the entity, the user input identifying a task to be performed by an automated assistant and on behalf of the user during the assisted telephone call, and the assisted telephone call to be initiated and conducted by the automated assistant;

in response to determining that the user input was provided by the user to initiate the assisted telephone call with the entity and prior to the automated assistant initiating the assisted telephone call with the entity:

obtain, from one or more databases, pre-call information that is stored in association with the entity and that is related to the task to be performed by the automated assistant and on behalf of the user during the assisted telephone call, the pre-call information being previously stored in the one or more databases based on one or more previous telephone calls with the entity related to the task;

cause the pre-call information that is stored in association with the entity and that is related to the task to be performed by the automated assistant and on behalf of the user during the assisted telephone call to be provided for presentation to the user via the client device; and cause a prompt that requests the user as to whether to cause the automated assistant to (1) proceed with initiating and conducting the assisted telephone call with the entity to perform the task on behalf of the user or (2) refrain from initiating the assisted telephone call with the entity;

receive, from the user, and based on user consumption of the pre-call information, a user selection directed to a portion of the prompt;

determine, based on the user selection, whether to cause the automated assistant to (1) proceed with initiating and conducting the assisted telephone call with the entity to perform the task on behalf of the user, or to cause the automated assistant to (2) refrain from initiating the assisted telephone call with the entity;

in response to determining to cause the automated assistant to (1) proceed with initiating and conducting the assisted telephone call with the entity to perform the task on behalf of the user:

cause the automated assistant to initiate and conduct the assisted telephone call with the entity to perform the task on behalf of the user; and in response to determining to cause the automated assistant to (2) refrain from initiating the assisted telephone call with the entity:

cause the automated assistant to refrain from initiating the assisted telephone call with the entity.

* * * * *